US009016910B2

(12) United States Patent
Bingle

(10) Patent No.: US 9,016,910 B2
(45) Date of Patent: Apr. 28, 2015

(54) VEHICULAR COMPONENT INCORPORATING CONCEALABLE INDICIA WITH CONTROLLED LIGHT TRANSMISSION

(75) Inventor: Robert Bingle, Walker, MI (US)

(73) Assignee: ADAC Plastics, Inc., Grand Rapids, MI (US)

( * ) Notice: Subject to any disclaimer, the term of this patent is extended or adjusted under 35 U.S.C. 154(b) by 72 days.

(21) Appl. No.: 13/492,491

(22) Filed: Jun. 8, 2012

(65) Prior Publication Data

US 2012/0313392 A1     Dec. 13, 2012

Related U.S. Application Data

(60) Provisional application No. 61/495,452, filed on Jun. 10, 2011.

(51) Int. Cl.
| | |
|---|---|
| B60R 13/00 | (2006.01) |
| B60Q 3/04 | (2006.01) |
| G09F 21/04 | (2006.01) |
| B60Q 1/32 | (2006.01) |
| B60Q 3/00 | (2006.01) |
| E05B 17/10 | (2006.01) |
| E05B 37/00 | (2006.01) |
| E05B 85/16 | (2014.01) |

(52) U.S. Cl.
CPC ......... B60R 13/005 (2013.01); Y10T 29/49826 (2015.01); B60Q 3/044 (2013.01); G09F 21/04 (2013.01); B60Q 1/323 (2013.01); B60Q 3/00 (2013.01); B60Q 2400/40 (2013.01); E05B 37/00 (2013.01); E05B 85/16 (2013.01); E05B 17/10 (2013.01)

(58) Field of Classification Search
CPC ....................................................... B60Q 3/044
USPC ............ 362/501, 459, 487, 509, 546, 311.01
See application file for complete search history.

(56) References Cited

U.S. PATENT DOCUMENTS

| 2,710,333 | A  * | 6/1955  | Yates ............................ 362/487 |
| 5,641,221 | A  * | 6/1997  | Schindele et al. ............ 362/501 |
| 6,160,475 | A  * | 12/2000 | Hornung et al. .............. 340/461 |
| 6,419,306 | B2 * | 7/2002  | Sano et al. ..................... 296/209 |
| 6,854,870 | B2 * | 2/2005  | Huizenga ....................... 362/501 |
| 7,237,933 | B2 * | 7/2007  | Radu et al. .................... 362/488 |
| 7,255,466 | B2 * | 8/2007  | Schmidt et al. ............... 362/501 |
| 7,270,452 | B2 * | 9/2007  | Wang ............................. 362/501 |
| 7,387,397 | B2 * | 6/2008  | Konet et al. ..................... 362/84 |
| 7,911,321 | B2 * | 3/2011  | Bingle et al. ................. 340/5.54 |

(Continued)

Primary Examiner — Mary Ellen Bowman
(74) Attorney, Agent, or Firm — Dickinson Wright PLLC

(57) ABSTRACT

A vehicular trim component with interior and exterior surfaces, the vehicular trim component comprising: an at least partially light-transmissive substrate having opposite first and second surfaces; an illumination source adjacent the second surface of the substrate, the illumination source actuatable between an illuminated state and a non-illuminated state; and a variably light-transmissive layer on the first surface of the substrate. The variably light-transmissive layer includes a non-light-transmissive opaque portion and a light-transmissive portion. The light-transmissive portion comprises one or more lines defined through the opaque portion and arranged to define visually perceptible indicia when backlit by the illumination source in its illuminated state. Each line is visually imperceptible to the naked eye from a distance of at least as close as approximately 3 feet from the trim component when the illumination source is in its non-illuminated state.

48 Claims, 33 Drawing Sheets

(56) References Cited

U.S. PATENT DOCUMENTS

| | | |
|---|---|---|
| 2002/0030988 A1* | 3/2002 | Stapf .............................. 362/85 |
| 2003/0031025 A1* | 2/2003 | Huizenga ...................... 362/501 |
| 2004/0233677 A1* | 11/2004 | Su et al. ........................ 362/501 |
| 2008/0068857 A1* | 3/2008 | Meinke et al. ................ 362/546 |
| 2009/0257241 A1* | 10/2009 | Meinke et al. ................ 362/546 |
| 2010/0219935 A1* | 9/2010 | Bingle et al. ................. 340/5.54 |
| 2011/0090709 A1* | 4/2011 | Wang ............................ 362/501 |

* cited by examiner

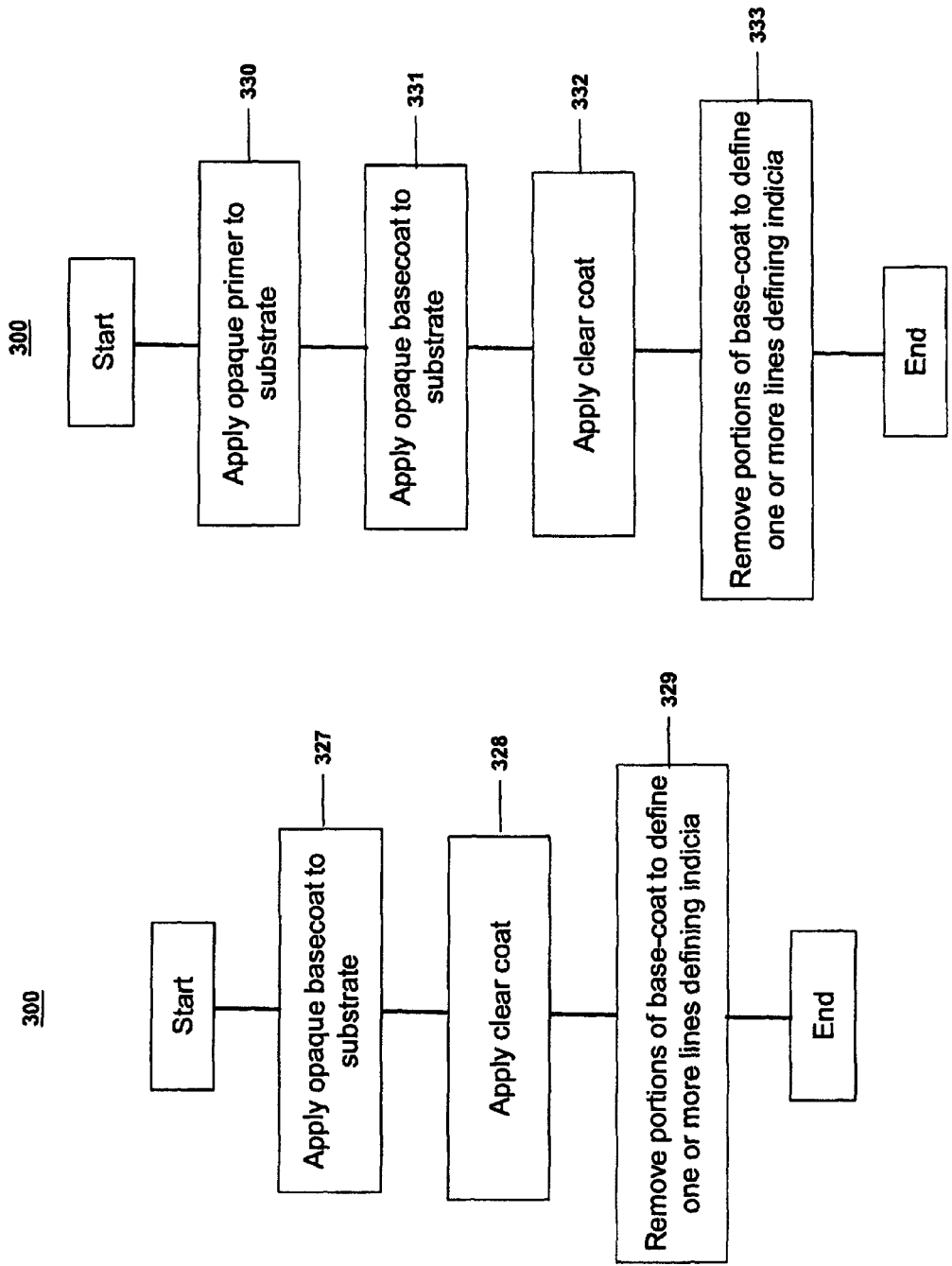

VEHICULAR COMPONENT INCORPORATING CONCEALABLE INDICIA WITH CONTROLLED LIGHT TRANSMISSION

CROSS-REFERENCE TO RELATED APPLICATIONS

The present application is related to, and claims the benefit of priority from, U.S. Provisional Patent Application Ser. No. 61/495,452, filed 10 Jun. 2011, the disclosure of which is hereby incorporated herein by reference in its entirety.

FIELD OF THE INVENTION

The invention relates generally to a variably illuminated visual representation or display. In one aspect, the invention relates to an arrangement of indicia, symbols, letters, numbers, and the like, that can be discerned when backlit, but practically concealed when non-backlit and exposed to ambient light.

BACKGROUND

Motor vehicles frequently incorporate a variety of decorative and functional vehicular trim components that are mounted to an exterior or interior surface of the vehicle. Examples of external trim components include, but are not limited to, spoilers, door and lift-gate handles, license plate frames, and various bars, such as a lighting bar above the license plate and a bar for mounting a center high mount stop light (CHMSL). Some of these components include indicia or other visual markings. The visual markings can be static, such as decorative markings that customize the appearance of the vehicle or indicia to communicate information, such as the make or model of the vehicle (known as "vehicle badging"), to an observer. Other visual markings are dynamic or interactive, such as turn signal indicators and brake lights that illuminate to communicate an intended action of the driver. Another example of a dynamic visual marking can be a keypad of a keyless entry system. Typically, the keypad is mounted on a door panel or a door handle and has a plurality of individual keys with numbers or letters thereon so that a user can depress the keys in a predetermined sequence to unlock the door of the vehicle.

At times, visual markings, such as turn signal indicators, keypads, and controls on the interior of the vehicle (e.g., cruise control, radio, and climate controls) can detract from the aesthetic appearance of the vehicle. Although these visual markings are not backlit while not in use, the non-illuminated marking can be viewable by an observer. Markings that are not illuminated at all times but are always discernible can distract a driver. It is therefore desirable for these markings to be viewable only when they are employed.

Additionally, the appearance of static visual markings, such as decorative markings, vehicle make/model indicia, and displays in the interior of the vehicle (e.g., instrument panel displays), can be drab and lackluster and, therefore, fail to create a selected appearance or fail to attract sufficient attention to the visual markings. Vehicle manufacturers advantageously utilize vehicle badging to not only identify the make and model of the vehicle, but also as an advertising medium. More visually captivating vehicle badging would be a more effective promotional tool. It is therefore desirable for a vehicular component to have visually alluring indicia or other markings.

Items other than vehicular trim components can suffer from similar aesthetic deficiencies. Examples of such items include household appliances, audio and video equipment, and signage. In today's competitive markets, the appearance of a product, or a display associated with a product or a business, can be a significant factor in a customer's purchase decision. A visually stimulating appearance that sets one product or display apart from others can increase the likelihood of a positive purchase decision.

SUMMARY OF THE DISCLOSURE

A vehicular trim component with interior and exterior surfaces, the vehicular trim component comprising an at least partially light-transmissive substrate having opposite first and second surfaces, an illumination source adjacent the second surface of the substrate, the illumination source actuatable between an illuminated state and a non-illuminated state, and a variably light-transmissive layer on the first surface of the substrate. The variably light-transmissive layer includes a non-light-transmissive opaque portion and a light-transmissive portion. The light-transmissive portion comprises one or more lines defined through the opaque portion, the lines arranged to define visually perceptible indicia when backlit by the illumination source in its illuminated state. Each line is visually imperceptible to the naked eye from a distance of at least as close as approximately 3 feet from the trim component when the illumination source is in its non-illuminated state.

In one embodiment, the variably light-transmissive layer comprises a basecoat of opaque paint applied to the first surface of the substrate. Optionally, the variably light-transmissive layer may further comprise a clear coat disposed on top of the basecoat of paint. The one or more lines may be defined through the base coat of paint and the clear coat or, alternatively, may be defined through the base coat of paint, while the clear coat covers the base coat and the one or more lines.

Optionally, the variably light-transmissive layer may further comprise an opaque primer applied to the first surface of the substrate, and a basecoat of opaque paint applied over the primer. The variably light-transmissive layer may further comprise a clear coat disposed on top of the basecoat of paint. The one or more lines may be defined through the basecoat of paint, the primer and the clear coat or, alternatively, the one or more lines may be defined through the basecoat of paint and primer, while the clear coat covers the basecoat and the one or more lines.

Per another embodiment, the variably light-transmissive layer may comprise an opaque film applied to the first surface of the substrate. The film may, for instance, be applied using a hydro-graphics process. Alternatively, the film may be insert molded with the substrate.

According to one feature, the variably light-transmissive layer may comprise at least one metal deposition layer.

Per another feature, the illumination source may comprise at least one light source selected from the group consisting of: a light-emitting diode, an incandescent light bulb, a fluorescent light bulb, an electroluminescent light source, a neon light, a light pipe received from a remote light source, a fiber optic-received light, a liquid-crystal display and a laser. The light source may, for instance, be a display screen, the display screen being hidden by the variably light-transmissive layer when the display screen is in the non-illuminated state.

According to another feature, the indicia may be at least one of a trademark, one or more alphanumeric characters, a logo, a design, a symbol, a picture, an image, an indicator, and a frit.

Per still a further feature, the substrate may comprise a material selected from the group consisting of: a polymeric material, glass, a conductive material, and silicone.

According to another feature, the substrate may comprise a translucent portion. The substrate may also include at least one optic area for distributing light passing through the translucent portion.

In various embodiments, the trim component may comprise a keyless entry pad, a door handle, and a lift handle for a rear lift gate.

There is also disclosed a method of manufacturing a vehicular trim component with interior and exterior surfaces, comprising the steps of: providing an at least partially light-transmissive substrate having opposite first and second surfaces; applying an opaque coating on the first surface of the substrate; removing part of the opaque coating to define one or more lines arranged to define visually perceptible indicia when backlit by an illuminated illumination source, each of the one or more lines being visually imperceptible to the naked eye from a distance of at least as close as approximately 3 feet from the trim component when the illumination source is in not illuminated; and positioning an illumination source adjacent the second surface of the substrate, the illumination source actuatable between an illuminated state and a non-illuminated state. When viewed from the exterior of the vehicular trim component, (i) the indicia is visually imperceptible to the naked eye from a distance of at least as close as approximately 3 feet from the trim component when the illumination source is in the non-illuminated state, and (ii) the indicia is visually perceptible when the illumination source is in the illumination state.

In one embodiment, the variably light-transmissive layer comprises a basecoat of opaque paint applied to the first surface of the substrate. Optionally, the variably light-transmissive layer may further comprise a clear coat disposed on top of the basecoat of paint. The one or more lines may be defined through the base coat of paint and the clear coat or, alternatively, may be defined through the base coat of paint, while the clear coat covers the base coat and the one or more lines.

Optionally, the variably light-transmissive layer may further comprise an opaque primer applied to the first surface of the substrate, and a basecoat of opaque paint applied over the primer. The variably light-transmissive layer may further comprise a clear coat disposed on top of the basecoat of paint. The one or more lines may be defined through the basecoat of paint, the primer and the clear coat or, alternatively, the one or more lines may be defined through the basecoat of paint and primer, while the clear coat covers the basecoat and the one or more lines.

The one or more lines may be defined by removing parts of the opaque coating and, optionally, the clear coat, by laser etching, for instance.

Per another embodiment, the opaque coating layer may comprise an opaque film applied to the first surface of the substrate. The film may, for instance, be applied using a hydro-graphics process. Alternatively, the film may be insert molded with the substrate.

According to one feature, the opaque coating may comprise at least one metal deposition layer.

Per another feature, the illumination source may comprise at least one light source selected from the group consisting of: a light-emitting diode, an incandescent light bulb, a fluorescent light bulb, an electroluminescent light source, a neon light, a light pipe received from a remote light source, a fiber optic-received light, a liquid-crystal display and a laser. The light source may, for instance, be a display screen, the display screen being hidden by the variably light-transmissive layer when the display screen is in the non-illuminated state.

According to another feature, the indicia may be at least one of a trademark, one or more alphanumeric characters, a logo, a design, a symbol, a picture, an image, an indicator, and a frit.

Per still a further feature, the substrate may comprise a material selected from the group consisting of: a polymeric material, glass, a conductive material, and silicone.

According to another feature, the substrate may comprise a translucent portion. The substrate may also include at least one optic area for distributing light passing through the translucent portion.

In various embodiments, the trim component may comprise a keyless entry pad, a door handle, and a lift handle for a rear lift gate.

BRIEF DESCRIPTION OF THE DRAWINGS

In the drawings:

FIGS. 17A through 17H are exemplary flowcharts of methods for producing a trim component with concealable indicia.

WRITTEN DESCRIPTION

Figure 1:
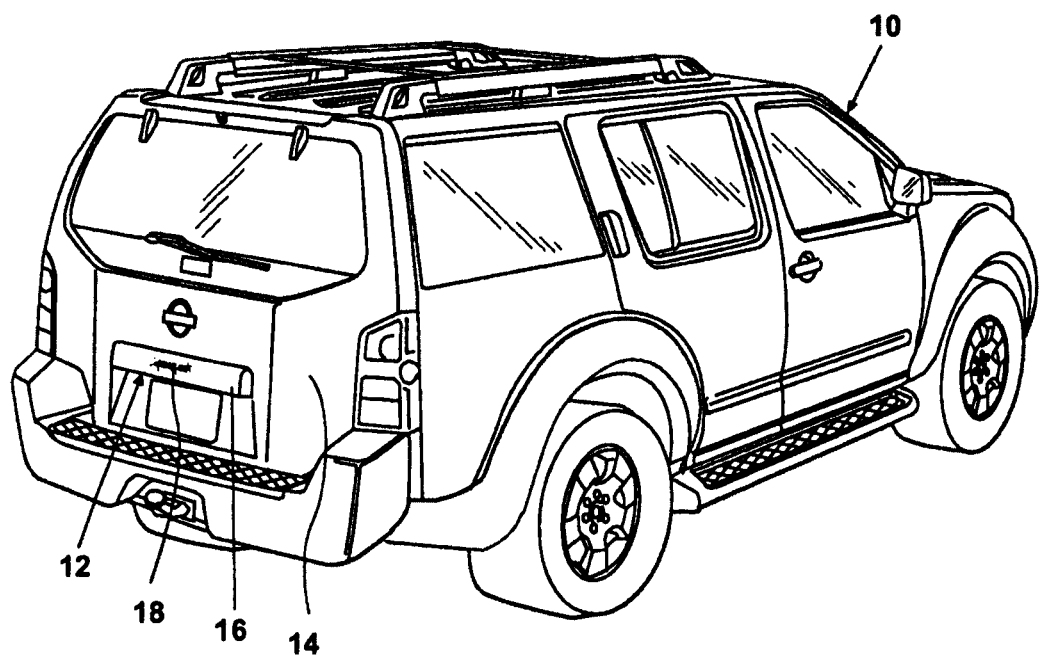
FIG. 1 is a perspective view of a motor vehicle including an external trim component with concealable indicia according to a first exemplary embodiment of the invention.

As utilized herein, the term "indicium" or "indicia" refers to any marking that can be visually observed. Examples of indicia include, but are not limited to, logos, numerical and textual characters, symbols, designs, images, and pictures. An exemplary design can include a frit, which can be found on automotive glass, and can comprise a solid, opaque line or band with parallel lines of progressively smaller opaque lines or dots to create an illusion of a gradual transition from opaque to transparent. The indicia can be communicative, functional, decorative, interactive, or a combination thereof.

As utilized herein, the term "trim component" or "trim component structure" refers to any component located on a surface of a vehicle, appliance, structure, piece of equipment, and the like. A vehicle can be an automobile or other type of powered vehicle, such as, without limitation, a motorcycle, a scooter, an all-terrain vehicle (ATV), a snowmobile, a wave runner, a jet ski, or a boat. The trim component can be decorative, functional, or a combination thereof.

Examples of exterior trim components include, but are not limited to, body side moldings; spoilers; door handles; license plate frames; hood, side, and brake louvers; truck caps and covers; and bars, such as a lighting bar above a license plate, and a bar for mounting a center high mount stop light (CHMSL). Additionally, the trim component can be adapted to provide lighting under the vehicle hood, hood cosmetic lighting, truck bed lighting, and flashing, strobe, or message lighting for emergency vehicles, such as ambulances, fire trucks, and police cruisers. Other examples of trim components include after-market custom accessories.

Examples of interior trim components include, but are not limited to, interior door handles; bezels for interior door handles; instrument clusters; gauges; odometer and speedometer displays; warning lamps; shifting mechanism position indicators; radio controls/knobs; climate control displays and controls; cruise control displays and controls; steering wheel mounted accessory controls (i.e., radio and cruise control controls); interior vehicle badging (e.g., on instrument panel, door panels, steering wheel); accessory lighting; identification labels (e.g., for cup holders, power outlet covers, shift knobs, glove box doors); visor lighting; and LCD or other types of flat panel displays, such as displays for sound systems, global positioning systems, and vehicular imaging systems. Additionally, the trim component can be adapted to provide trunk interior lighting, safety lighting on an interior surface of the door that illuminate when the door is opened, and headliner trim lighting, such as task, ambient, and mood lighting.

The trim component is not limited to vehicular trim components or use with vehicles. The invention as described herein can also be used in non-automotive applications. Such applications can include those associated with user-operated control mechanisms that would be preferable aesthetically when concealed while not in use. Examples of such devices include, but are not limited to, appliances such as microwave ovens, clothes washers and dryers, ranges, stovetops, ovens, countertop kitchen appliances, and lawn and garden appliances, such as trimmers, edgers, blowers, snow blowers, and lawn mowers; audio and visual entertainment devices, such as stereo components, televisions, stationary and portable video game consoles, portable music players including MP3 players, CD players, and radios; portable personal computers including laptops and personal digital assistants (PDAs); remote controls; and calculators. The invention can also be utilized for non-interactive displays, such as house or building address numbers, advertisement signs, product displays in stores, and open/closed signs for businesses. Other examples of exterior house components suitable for use with the invention include soffits and soffit inserts (e.g. for concealing holiday or other decorative lighting), garage door panels, rain gutters, fencing and railings, and solar panel covers. The invention can also be employed in the interior of the home, such as with staircase hand rails and baseboards. Additionally, the invention can be incorporated with home security systems to conceal interior and/or exterior security cameras. Furthermore, it is also contemplated that the invention can be utilized with office furniture.

In general, the invention can be employed in numerous applications, such as those identified above, only a few examples of which are described herein. The embodiments of the invention are described herein for illustrative purposes only, and it should be understood that the invention can be employed in alternate applications, including as referenced above.

Referring now the drawings, FIG. 1 illustrates an exemplary embodiment of the invention comprising a motor vehicle 10 having a rear lift gate 14. The rear lift gate 14 includes an exemplary trim component 12 illustrated as a lift handle 16, with concealable indicia 18. The indicia 18 can be displayed when backlit, as described hereinafter. When the indicia 18 are not backlit, they can be indiscernible, and the trim component 12 can have the appearance of a trim component without indicia.

Figure 2:
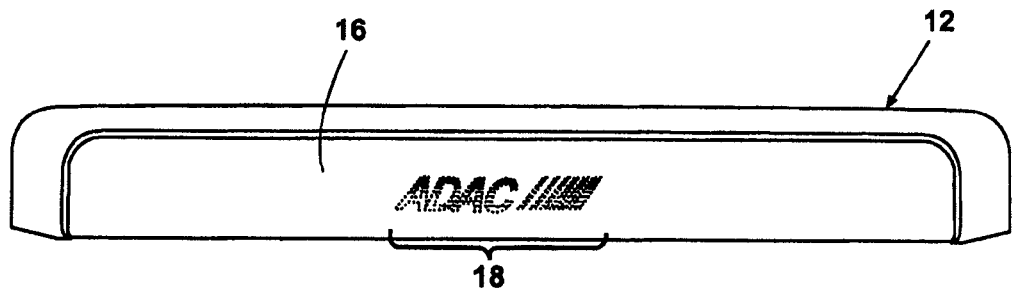
FIG. 2 is a front elevational view of the external trim component of FIG. 1 in a non-backlit state with the indicia concealed.
Figure 3:
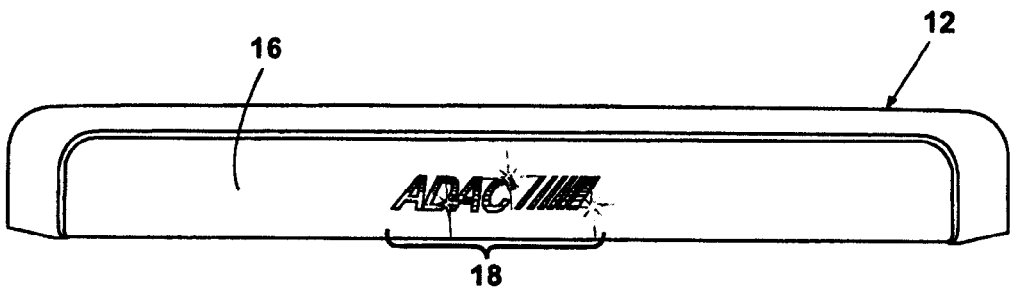
FIG. 3 is a front elevational view of the external trim component of FIG. 1 in a backlit state with the indicia revealed.
Figure 4:
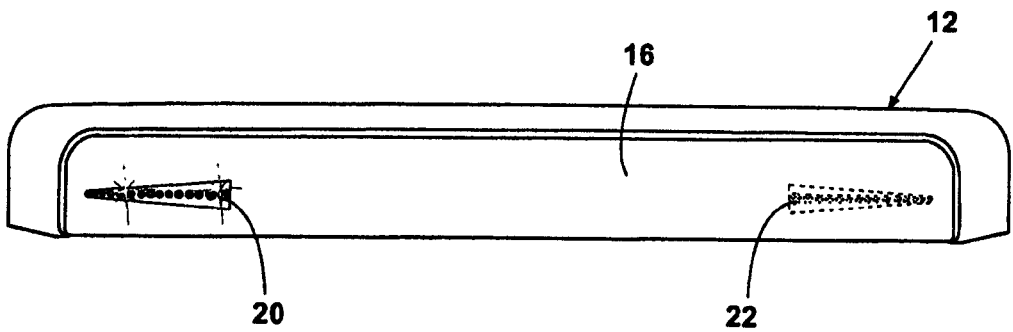
FIG. 4 is a front elevational view of the external trim component of FIG. 1 showing the indicia configured as turn signals.

The configuration of the trim component 12 illustrated in FIG. 1 is illustrated in greater detail in FIGS. 2-7. FIG. 2 illustrates the trim component 12 in a non-backlit state, wherein the trim component 12 appears not to include any indicia thereon (the indicia 18 are shown in phantom in FIG. 2 to represent this state). However, when the trim component 12 is backlit, the indicia 18 can be revealed, as illustrated in FIG. 3. FIG. 3 illustrates indicia 18 comprising textual characters and a symbol. FIG. 4 illustrates indicia 18 in the form of turn signals 20, 22. As discussed above, the indicia 18 can comprise virtually any selected character. The indicia 18 can be selectively sized and positioned for viewing from a selected distance and orientation relative to the trim component 12.

Figure 5:
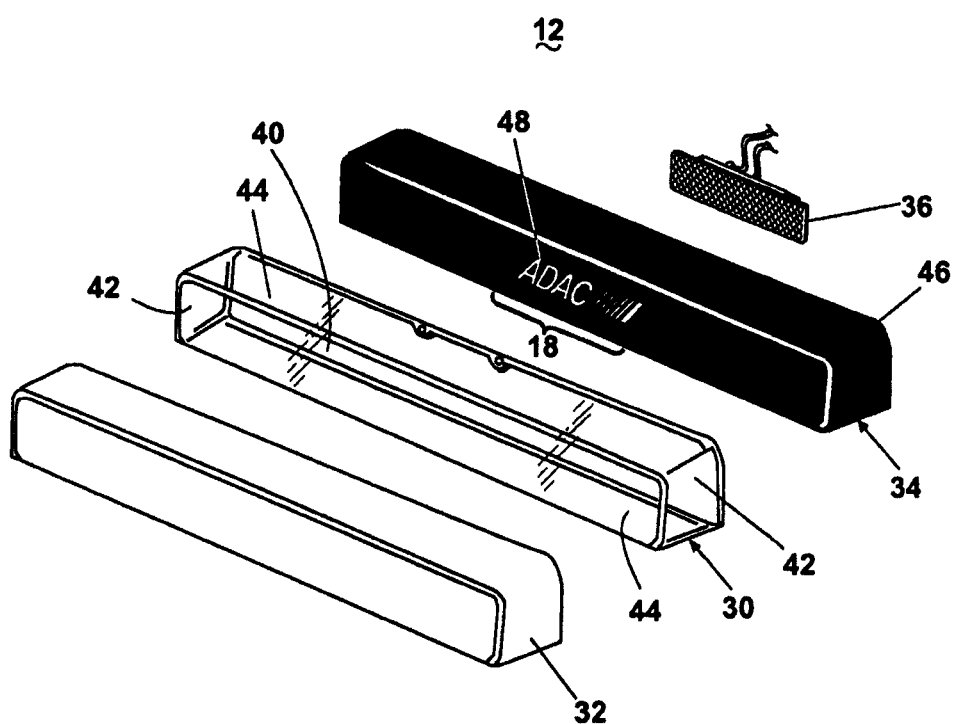
FIG. 5 is an exploded view of the external trim component of FIG. 1.
Figure 5A:
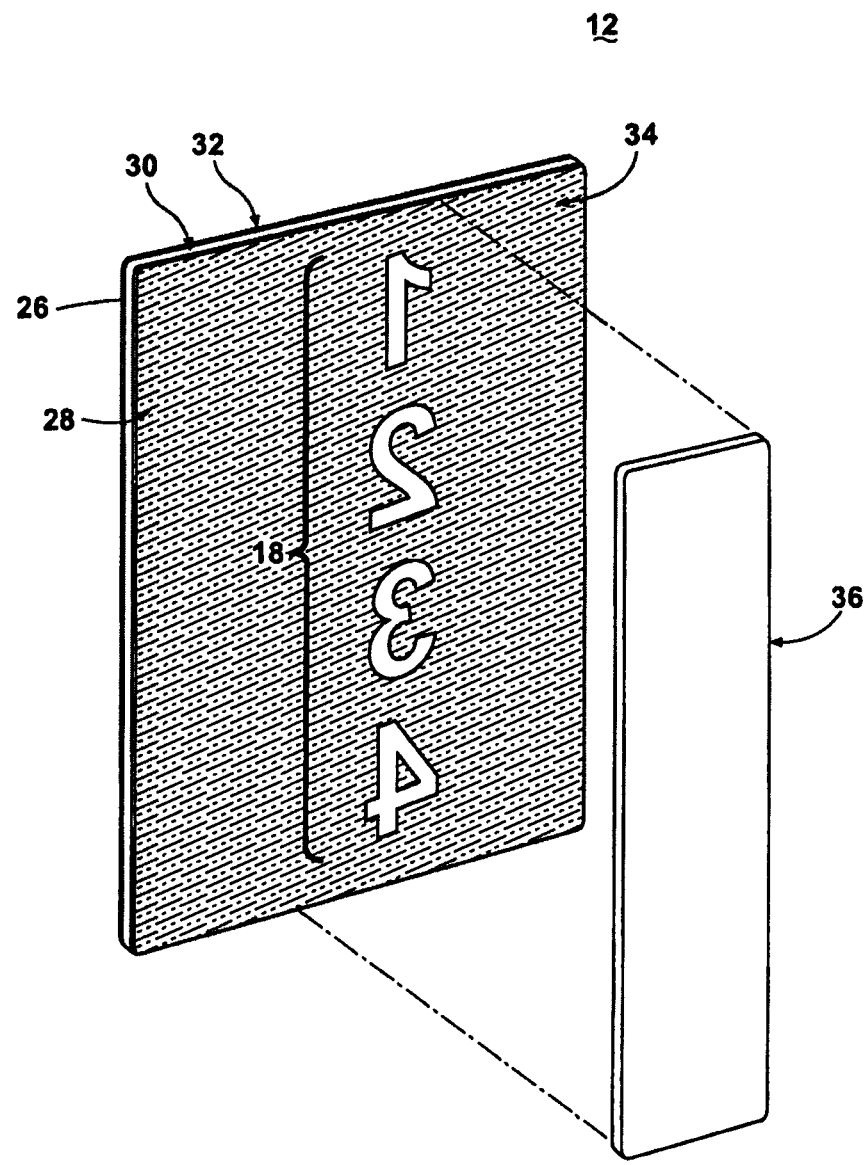
FIG. 5A is a partially exploded schematic view of a first configuration of the fundamental elements of the external trim component of FIG. 1 illustrating a substrate, a controlled-illumination coating on the "A" surface, a mask coating on the "B" surface with laser etched indicia, and an illumination source.
Figure 6:
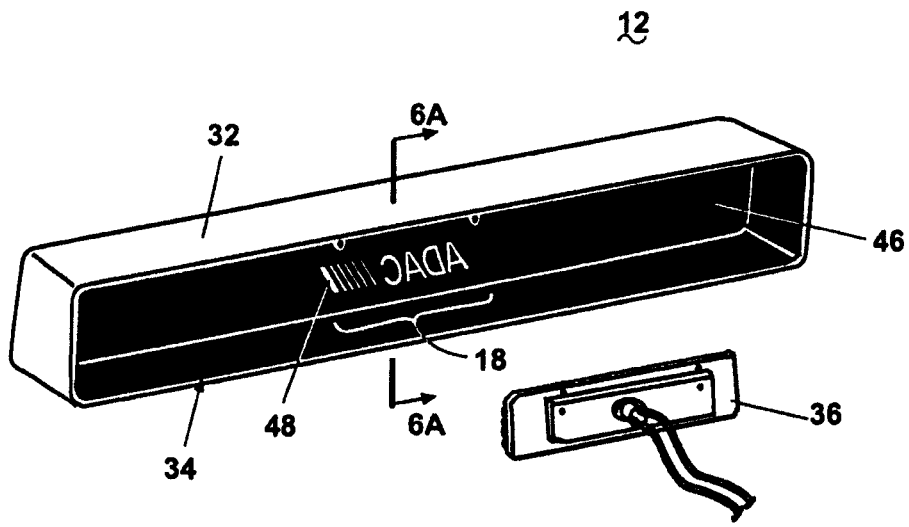
FIG. 6 is a partially exploded rear view of the external trim component of FIG. 1.

Referring now to FIGS. 5, 5A, and 6, the trim component 12 can include a substrate 30 having an external surface 26, also referred to as an "A" surface, and an internal surface 28, also referred to as a "B" surface. The trim component 12 is illustrated in FIG. 5 as including a face 40 and pairs of opposing side walls 42 and upper and lower walls 44 extending rearward from and generally orthogonal to the face 40. As illustrated in FIG. 5A, the substrate 30 can have a variably light-transmissive layer 32 on the "A" surface 26. A mask 34, which can define the indicia 18, and an illumination source 36, can be located on and adjacent to, respectively, the "B" surface 28 of the substrate 30. As used in this application, the terms "forward" and "rearward" will generally refer to orientations of the two substrate surfaces 26, 28 that are, respectively, further from and nearer the illumination source 36. For example, the "A" surface 26 can be the forward surface of the substrate 30, and the "B" surface 28 can be the rearward surface of the substrate 30.

The substrate 30 can provide a structural base for the trim component 12 and can be made of glass, a polymeric material, such as silicone or nylon, or other selected material. For example, the substrate 30 can be at least partially made of a conductive material whose optical characteristics, such as opacity, can change when an electrical current is applied thereto. The substrate 30 can be of any selected thickness to render the substrate 30 rigid or flexible. A flexible substrate, such as a flexible film, can enable the substrate to be manufactured based upon a selected configuration for the trim component 12. The substrate 30 can be translucent, or tinted, e.g. smoky or amber, to provide a selected visual effect.

The variably light-transmissive layer 32 on the "A" surface of the substrate 30 can be configured to appear substantially opaque, thereby concealing the mask 34, the indicia 18, and the illumination source 36, when the illumination source 36 is not illuminated, particularly when the substrate 30 is exposed to ambient light. The variably light-transmissive layer 32 can additionally be configured so that the trim component 12 has the appearance of "blending in" with adjacent areas of the vehicle 10 when the illumination source 36 is not illuminated. Moreover, the variably light-transmissive layer 32 can be configured to transmit light emitted from the illumination source 36 so that the indicia 18 can be discerned.

The variably light-transmissive layer 32 can be a coating applied to the "A" surface of the substrate 30. Exemplary coating materials include, but are not limited to paints, including metallic paints. Other suitable coatings include automotive and non-automotive grade paints, which can be applied using a spraying process. The coating can be applied in accordance with a particular thickness required to achieve the selected optical characteristics for the variably light-transmissive layer 32. Optionally, the coating can be tinted to a selected color, for example to match the trim component 12 to the vehicle finish, and the variably light-transmissive layer 32 can receive a protective clear coat, which also can be tinted to achieve a selected color. The coating can also be in the form of a metal, such as aluminum or chromium, deposited onto the trim component 12 utilizing a suitable metal deposition process.

Alternatively, the variably light-transmissive layer 32 can comprise a separate component made of or coated with a material incorporating the characteristics described above. For example, the variably light-transmissive layer 32 can be a thin film made of a suitable material, such as a polymeric or fabric material, laid on the substrate 30 to provide a selected aesthetic appearance and selected optical characteristics for the trim component 12. The film can have a solid color or can include a pattern or image. A film can be applied to the substrate 30 through a hydrographic process. For example, a film having a selected appearance, such as a simulated carbon fiber appearance, can be floated on a liquid, and the substrate 30 can be dipped into the liquid such that the film can bond to the substrate 30 upon removal from the liquid. The film can also be insert molded with the substrate 30. In this process, the film can be inserted into a mold cavity, and then the mold can be closed for injection of material to form the substrate 30. The film and the substrate 30 can effectively become a single component, with the film functioning as a cosmetic outer skin of the substrate 30.

The variably light-transmissive layer 32 can be texturized to create selected visual and tactile characteristics. For example, a textured finish can create a selected light output, such as by filtering or diffusing light from the illumination source 36. Furthermore, the variably light-transmissive layer 32 can have a texture different than the texture of adjacent areas of the vehicle 10 to provide a separate aesthetic in addition to illumination-controlling properties.

The variably light-transmissive layer 32 can be fabricated of any material(s) and can have any form suitable to impart the optical characteristics described above. The selected optical characteristics of the variably light-transmissive layer 32, such as light transmissivity, can be controlled by selective control of finish properties such as chemical composition, color, applied thickness, and the like. The wavelength of the light emitted by the illumination source 36 can also control the transmissivity of the variably light-transmissive layer 32.

Not all colors of light pass through all colors of paint with the same color or intensity. In an alternate embodiment, shown in FIGS. 17C through 17H and FIGS. 25 through 31, the light transmissivity of the variably light-transmissive layer 32' can be controlled to define both indicia 18' and opaque portions by selective application of the variably light-transmissive layer 32' to the substrate 30'. In effect, the variably light-transmissive layer 32' can be configured as both a mask and a light controlling layer. This can be effected by applying an opaque paint or other suitably opaque coating over the entire indicia area, then selectively removing the paint or other opaque coating in a controlled manner to create the indicia 18'.

Except as otherwise indicated, this embodiment is or may be essentially the same as the other versions of the invention as described elsewhere herein.

The process can generally include molding a translucent trim component, optionally masking the "B" surface (to avoid the application of paint or other opaque coating thereon), applying an opaque coating to the "A" surface, etching the indicia 18' on the "A" surface, and removing the mask from the "B" surface to enable the indicia 18' to be illuminated. The "A" surface opaque coating can include a layer of primer and an opaque basecoat. Optionally, as discussed below, a clear coat may also be applied over the basecoat. Alternatively, the "A" surface coating can include an opaque basecoat and a clear coat, thus dispensing with the primer. Although optional, the use of primer is desirable in some circumstances where the opaque basecoat is itself insufficient to mask perceptibility of the illumination source outside the area of the indicia, and/or where the opaque basecoat more readily adheres to the primer than to the material of the underlying substrate 30'.

The entire "B" surface can be masked, masking can be completed only in the area encompassing the indicia 18', or masking can be foregone altogether. In all events, it will be appreciated that, in this particular variant of the invention, the use of a permanent opaque mask on the "B" surface of the substrate is generally unnecessary since the indicia are defined in the "A" surface and the opaque basecoat and, where used, opaque primer, define a mask for the illumination source.

After the basecoat (and, where employed, primer and/or clear coat) has cured sufficiently, portions of the basecoat, etc. can be removed to define very thin lines utilizing a process, such as laser etching, by way of non-limiting example, capable of producing lines of a selected width. The lines can be configured to define the indicia 18' when backlit, and to effectively conceal the indicia 18' when not backlit.

The lines defining the indicia 18' can be as thin as possible to make the indicia as imperceptible as desired. In the exemplary embodiment, a laser is employed that is capable of etching lines of slightly less than one millimeter in width. This width, in practice, generally makes the indicia 18' visually imperceptible from a distance of more than a few feet away from the trim component.

Of course, the visual imperceptibility of the indicia 18' will also depend to some extent on the color of the basecoat, as some colors (e.g., white) create a higher contrast with the lines than others, thereby making the lines more perceptible when the indicia is not illuminated.

In one embodiment, the lines can be fashioned so as to simply outline the indicia 18'. This may be accomplished with the creation of a single line or a plurality of lines, arranged, for example, in parallel.

In another embodiment, the lines can be fashioned so as to be disposed in parallel, cross-hatched, or otherwise arranged to define more than just the outline of the desired indicia 18'.

However a plurality of lines are arranged to define the desired indicia 18', it will be appreciated with the benefit of this disclosure that the width and closeness of such lines affects both the appearance of the indicia 18' in the illuminated condition, as well as the relative imperceptibility of the indicia 18' in the non-illuminated condition. More precisely, the higher the density of lines in a given area, and the greater the thickness of those lines, the more perceptible will be the indicia 18' defined thereby when in the non-illuminated condition. Those same characteristics of the lines, on the other hand, will make the indicia 18' more perceptible in the illuminated condition. The balance to achieving any desired appearance for a given indicia, therefore, is between a sufficient density and thickness of lines to make the indicia acceptably perceptible when illuminated but acceptably imperceptible when not illuminated.

After the production of the lines has been completed, the trim component 12', or just the indicia area, can receive a layer of clear coat. The clear coat can protect the basecoat, and can decrease of the visibility of the indicia 18' in non-illuminated conditions by filling in the lines of removed material to provide a finish having a uniform depth so that no changes in surface texture from the paint removal can be observed or felt. Alternatively, the clear coat can be applied prior to the process of forming the lines so that the lines can be defined by the removal of the basecoat and the clear coat (and, if also utilized, the primer coat).

Referring specifically to FIGS. 26 through 31, the various possible forms of the trim component 12' as described generally above can be seen to include the following:

A first form (FIG. 26) wherein the opaque portion of the variably light-transmissive layer 32' comprises an opaque basecoat 32b' applied over the "A" surface of the substrate 30', with the indicia 18' being defined by the creation of one or more lines through the basecoat 32b', such as by laser etching, for instance.

A second form (FIG. 27) wherein the opaque portion of the variably light-transmissive layer 32' comprises an opaque primer 32p' applied over the "A" surface of the substrate 30', and an opaque basecoat 32b' applied over the primer coat 32p', with the indicia 18' being defined by the creation of one or more lines through the basecoat 32b' and the primer 32p', such as by laser etching, for instance.

A third form (FIG. 28) wherein the opaque portion of the variably light-transmissive layer 32' comprises an opaque primer 32p' applied over the "A" surface of the substrate 30', and an opaque basecoat 32b' applied over the primer coat 32p', with the indicia 18' being defined by the creation of one or more lines through the basecoat 32b' and the primer 32p', such as by laser etching, for instance. Following the creation of the indicia 18', a clear coat 33' is applied over the basecoat 32b' and the indicia 18'.

A fourth form (FIG. 29) wherein the opaque portion of the variably light-transmissive layer 32' comprises an opaque basecoat 32b' applied over the "A" surface of the substrate 30', with the indicia 18' being defined by the creation of one or more lines through the basecoat 32b', such as by laser etching, for instance. Following creation of the indicia 18', a clear coat 33' is applied over the basecoat 32b' and the indicia 18'.

A fifth form (FIG. 30) wherein the opaque portion of the variably light-transmissive layer 32' comprises an opaque basecoat 32b' applied over the "A" surface of the substrate 30'. Additionally, a clear coat 33' is applied over the basecoat 32b'. The indicia 18' are defined by the creation of one or more lines through the basecoat 32b' and the clear coat 33', such as by laser etching, for instance.

A sixth form (FIG. 31) wherein the opaque portion of the variably light-transmissive layer 32' comprises an opaque primer 32a' applied over the "A" surface of the substrate 30', and an opaque basecoat 32b' applied over the primer coat 32p'. Additionally, a clear coat 33' is applied over the basecoat 32b'. The indicia 18' are defined by the creation of one or more lines through the primer 32p', the basecoat 32b', and the clear coat 33', such as by laser etching, for instance.

It will be appreciated that the one or more lines defining the indicia may be defined completely through the opaque portion of the variably light-transmissive layer or, alternatively, may be defined to a depth that is less than the overall thickness of that opaque portion.

According to another embodiment, the indicia 18 can be defined by a masked, i.e. opaque, portion 46 and an unmasked portion 48 that transmits more light than the masked portion 46. The variably light-transmissive layer 32 can extend over the substrate 30 to effectively cover both the masked portion 46 and the unmasked portion 48. The variably light-transmissive layer 32 can conceal visible differences between the masked portion 46 and the unmasked portion 48 when the illumination source 36 is not illuminated. Thus, the indicia 18 can be rendered visually indiscernible when the illumination source 36 is in a non-illuminated state.

The mask 34 is illustrated in FIG. 5 with the unmasked portion 48 aligned with the face 40 of the substrate 30. It is within the scope of the invention for the unmasked portion 48 to encompass any portion of the mask 34. The mask 34 is illustrated in FIG. 5 as applied to the "B" surface 28 of the substrate 30; however, the mask 34 can be applied to the "A" surface 26 of the substrate 30.

Figure 6A:
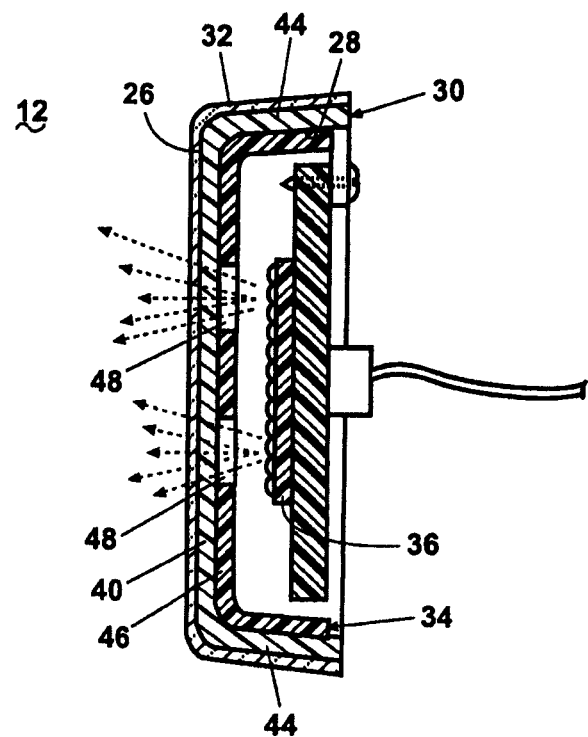
FIG. 6A is a cross-sectional view taken along line 6A-6A of FIG. 6.

The masked portion 46 can be completely opaque to ensure that light from the illumination source 36 passes only through the unmasked portion 48, which can be generally translucent, transparent, or hollow (i.e., an opening or aperture). As a result, when the illumination source 36 is illuminated, light can shine through the unmasked portion 48, the substrate 30, and the variably light-transmissive layer 32 to render the indicia 18 visible to the observer, as illustrated in FIG. 6A. Alternatively, the opacities of the masked and unmasked portions 46, 48 can be selected so that light shines through both the masked and unmasked portions 46, 48, but at different intensities to render the indicia 18 visually discernible. The unmasked portion 48 can also be colored so that light shining therethrough is colored to further enhance the visibility of the indicia 18.

The mask 34 can be made of any materials(s) and have any form suitable to create the masked portion 46 and the unmasked portion 48. The mask 34 can be, for example, a separate component made of an opaque material, such as a polymeric material or a fabric, with the unmasked portion 48 formed by material removed therefrom, or the mask 34 can be a separate component, such as a secondary substrate, with an opaque coating thereon. Alternatively, the mask 34 can be a coating, such as paint, applied to the substrate 30, or the mask 34 can be a film mounted to the substrate 30 by an adhesive or the like. The mask 34 can also be formed integrally with the substrate 30, such as by removing material from the substrate 30 to form thin walled portions that allow light to pass through when backlit by the illumination source 36 or by molding the substrate 30 with a mold having a design that incorporates thin walled portions. In these examples, the thin walled portions form the unmasked portion 48 of the mask 34.

Different methods can be employed for fabricating the mask 34. For example, referring to FIG. 5A, the mask 34 can be applied over the entire "B" surface of the substrate 30 using a coating or printing process. In one alternative, the indicia 18 can be defined by selectively removing portions of the mask 34, such as by laser etching. Methods such as laser etching and CNC machining processes, for example, involve removing material to form the unmasked portion 48. In laser etching, an opaque coating, such as paint, can be applied to the substrate 30 or a separate structural component to form the masked portion 46, and a laser can subsequently remove the paint to form the unmasked portion 48. Known CNC machining processes, such as cutting or milling, can be used to remove material from a component to form the unmasked portion 48. The material can either be completely removed or selectively thinned to form the unmasked portion 48 and enable light from the illumination source 36 to pass through.

Alternatively, screen printing (e.g. silk screening), can be used wherein ink or other opaque material can be selectively passed through a screen onto the "B" surface to define the indicia 18. In yet another alternative, ink or other material can be transferred utilizing a printing pad process from an ink pad to the "B" surface using a stamp configured to define the indicia 18.

Figure 5B:
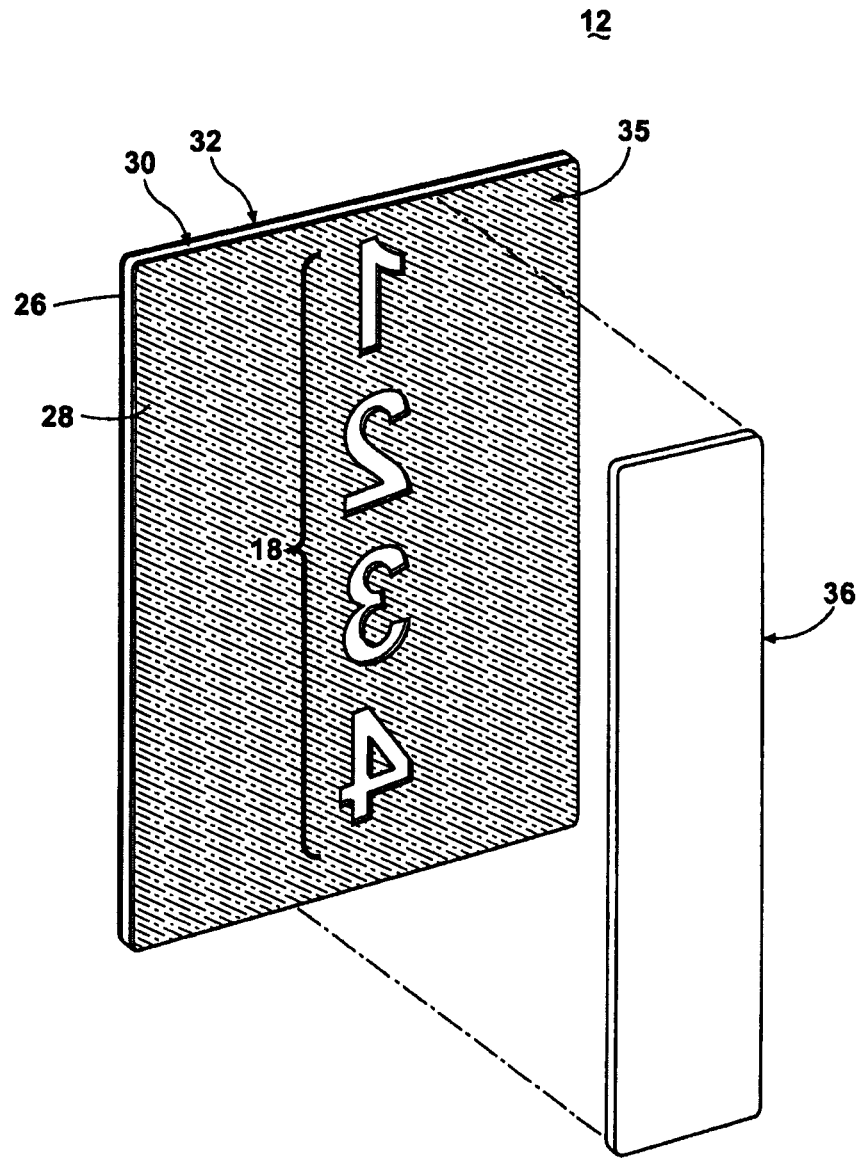
FIG. 5B is a partially exploded schematic view of a second configuration of the fundamental elements of the external trim component of FIG. 1 illustrating a substrate, a controlled-illumination coating on the "A" surface, an adhesive mask on the "B" surface with cut or printed indicia, and an illumination source.

Referring to FIG. 5B, a mask 35 is illustrated that can comprise an adhesive film or layer applied to the "B" surface. The indicia 18 can be defined, such as by cutting or punching out selected portions of the mask 34, either before or after application of the adhesive film or layer to the substrate 30. Alternatively, the adhesive film or layer can be fabricated prior to application, with indicia defined by printing such that light can pass through the indicia 18 but not the opaque portion of the mask 34.

The illumination source 36 can be positioned on the rearward side of the substrate 30, variably light-transmissive layer 32, and mask 34, and mounted directly to the trim component 12 as illustrated in FIG. 6A, or mounted to an outer panel of the vehicle 10 rearward of the trim component 12. The illumination source 36 can be any suitable light generating device, including, but not limited to, one or more light emitting diodes (LED), organic light emitting diodes (OLED), electroluminescent sources (e.g. light pads), incandescent light bulbs, fluorescent light bulbs, neon lights, and lasers. Another example of an illumination source can be a display screen, such as a liquid crystal display (LCD) or plasma display. The illumination source 36 can comprise light pipes and fiber optics that receive light from a remote light source and distribute the light with minimal loss of intensity. The light pipe/fiber optics can collect light from the illumination source 36 and project the light in a pattern corresponding to the indicia 18. Additionally, the illumination source 36 can be white or colored, or can comprise multiple light sources of differing colors.

The illumination source 36 can be connected to an electrical system of the vehicle 10, and can remain continuously in an illuminated state, or adapted to alternate between the illuminated state and the non-illuminated state in response to one or more conditions of the vehicle 10 or its environment. For example, the illumination source 36 can be adapted to illuminate when the user actuates the ignition, actuates a turn signal switch, brakes, accelerates, actuates a remote fob for a keyless entry system, touches an entry handle, or when an observer is within a predetermined distance from the vehicle 10. Further, the illumination source 36 can be voice activated by the user. Optionally, the illumination source 36 can operate in a plurality of illumination states, wherein the intensity of the light from the illumination source 36 can be different for each illumination state. For example, the illumination states can comprise a standby illumination state wherein the intensity of the light from the illumination source 36 can be less than during an active illumination state.

The illumination source 36 can be adapted to form the mask 34. For example, an electroluminescent pad can be shaped according to the indicia 18, or a coating can be applied to the pad to effectively create a mask or stencil on the pad and define areas through which light can pass. Alternatively, a plurality of LEDs can be configured in a shape corresponding to the indicia 18. Light pipes and fiber optics can be molded into the substrate 30 to effectively serve as a mask.

The trim component 12 can further comprise electronics (not shown), such as switches and sensors for receiving input from the user. For example, the trim component 12 can comprise a membrane switch, or capacitance or field effect sensors, that generate a signal upon actuation thereof by the user. Furthermore, the electronics can comprise the aforementioned display screen, which can be used, for example, in conjunction with a global positioning system and/or a computer in the vehicle 10. An example of a trim component in the form of a door handle employing such electronics is described below with respect to FIG. 12.

Figure 7:
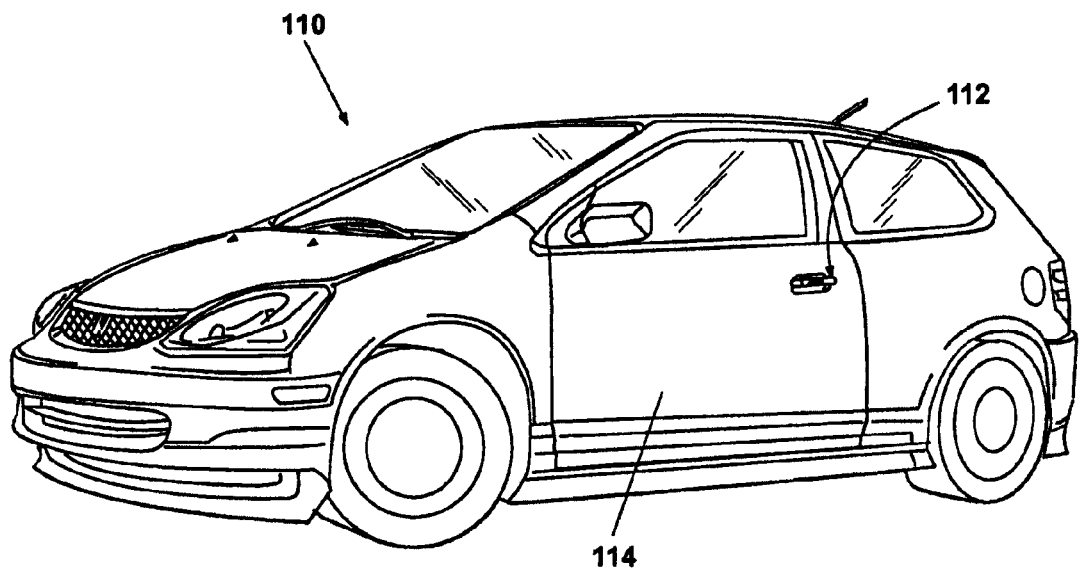
FIG. 7 is a perspective view of a motor vehicle including an external trim component with concealable indicia according to a second exemplary embodiment of the invention.

FIG. 7 illustrates a further exemplary embodiment of the invention comprising a vehicle 110 with a trim component 112. The trim component 112 is illustrated in further detail in FIGS. 8-11, and is illustrated as a vehicular door handle mounted to an exterior surface of a door 114 of the vehicle 110.

Figure 8:
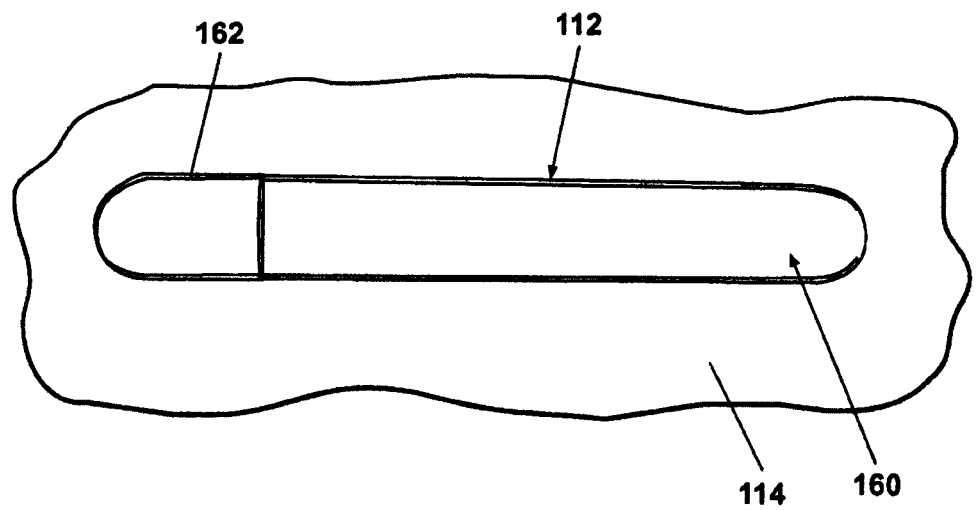
FIG. 8 is a front elevational view of the external trim component of FIG. 7 in a non-backlit state with the indicia concealed.
Figure 9:
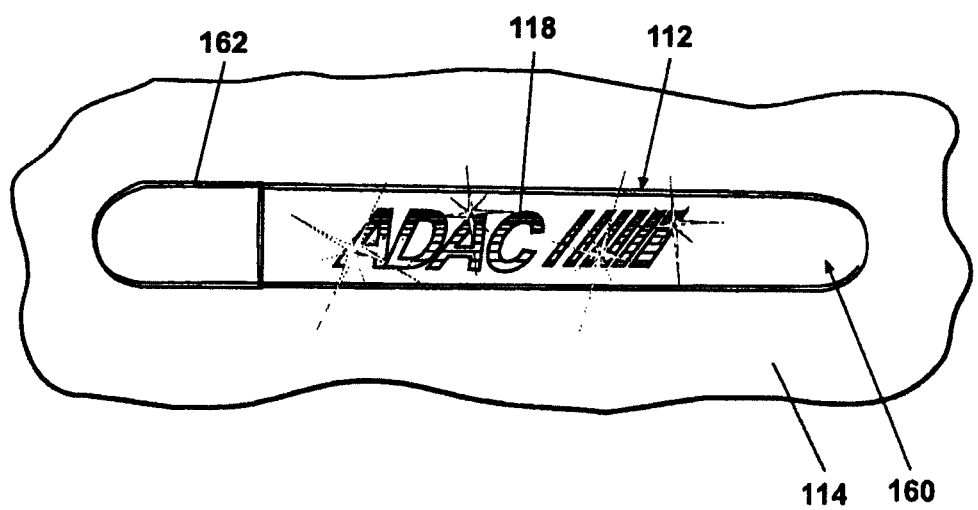
FIG. 9 is a front elevational view of the external trim component of FIG. 7 in a backlit state with the indicia revealed.

FIG. 8 illustrates the trim component 112 in a non-illuminated state, wherein the trim component 112 appears as if it does not have indicia thereon. However, when the trim component 112 is illuminated, indicia 118 in an illuminated state can be viewed by an observer, as illustrated in FIG. 9. The indicia 118 of FIG. 9 are illustrated as a logo comprising textual characters and a symbol.

Figure 10:
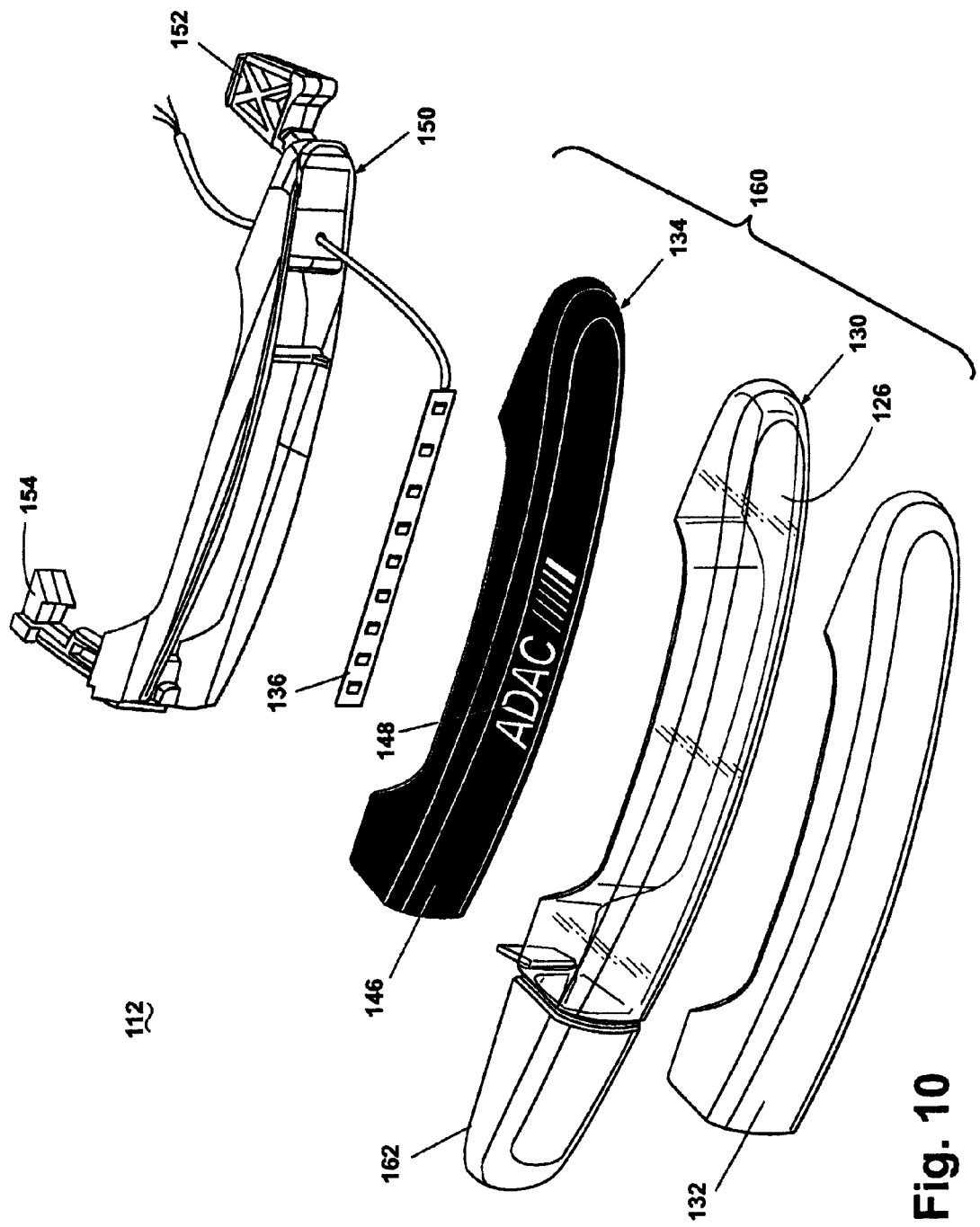
FIG. 10 is an exploded view of the external trim component of FIG. 7.
Figure 11:
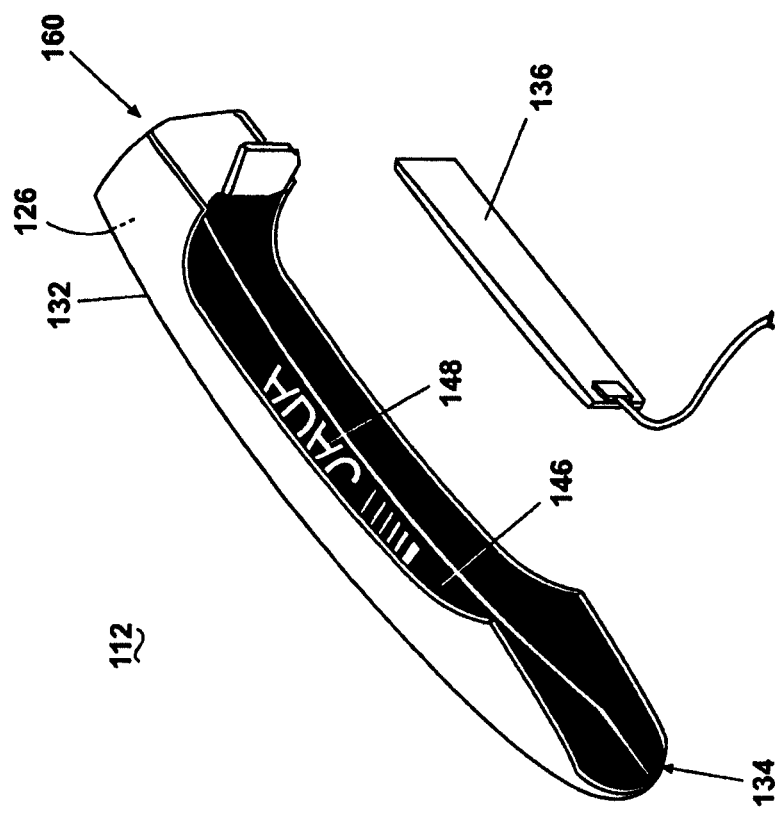
FIG. 11 is a partially exploded rear view of the external trim component of FIG. 7.

Referring additionally to FIGS. 10 and 11, the trim component 112 in the form of the door handle comprises a handle base 150, a handle cap 160 removably mounted to the handle base 150, and a bezel 162 mounted on the door 114 adjacent the handle base 150 and the handle cap 160. It will be apparent to one of ordinary skill in the vehicular component art that the trim component 112 can comprise other elements that relate to other functions of the door handle.

The handle base 150 can be mounted to an external surface of the door 114 and comprises a pivot mount 152 at one end thereof for pivotally mounting the handle base 150 to the door 114 and a latch actuator 154 at an opposite end 152. The pivot mount 152 and the latch actuator 154 can be positioned inside the door 114 such that they are not visible from the exterior of the vehicle 110. The latch actuator 154 can be operatively coupled to a door latch (not shown) in any suitable manner, and displacement of the latch actuator 154 during pivotal movement of the housing body 150 about the pivot mount 152 releases the door latch so that the user can open the door 114 and enter the vehicle 110.

The handle cap 160 can be mounted to a forward surface of the handle base 150 to provide a selected external appearance to the trim component 112. When the user grasps the trim component 112 to pivot the handle base 150 and release the door latch, the user grasps both the handle base 150 and the handle cap 160. Similar to the trim component 12 of the first embodiment, the handle cap 160 comprises a substrate 130 with a variably light-transmissive layer 132 on an external surface 126 and a mask 134 on an internal surface 128. The trim component 112 further comprises an illumination source 136 located between the handle cap 160 and the handle base 150. The substrate 130, the variably light-transmissive layer 132, the mask 134, and the illumination source 136 can be similar to the corresponding components of the first embodiment and function in the same manner with respect to the indicia 118 and its visibility to an observer.

The handle cap 160 can be removably mounted to the handle base 150 and can be exchanged with a replacement handle cap 160 having different indicia 118 thereon. Because the handle cap 160 can be replaced, the user can personalize the trim component 112 with a personalized handle cap having personalized indicia on the corresponding mask. Furthermore, the manufacture and assembly of the trim component 112 can be facilitated by the replaceable nature of the handle cap 160; the handle cap 160 can be the only part of the trim component 112 that must be custom made for a particular make or model of vehicle. When replacing the handle cap 160, the entire handle cap 160 can be removed and exchanged. Alternatively, if the mask 134 is not integral with the substrate 130, then only the mask 134 must be removed and exchanged.

Figure 12:
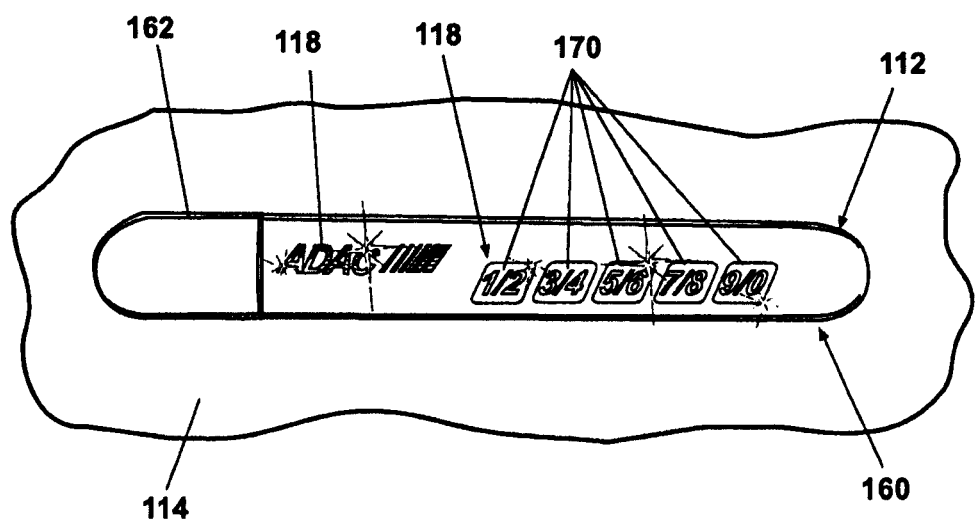
FIG. 12 is a front elevational view of an external trim component with concealable indicia in a backlit state with the indicia including a logo and a keyless entry pad according to a third exemplary embodiment of the invention.

FIG. 12 illustrates another exemplary embodiment of the invention comprising the indicia 118 integrated with a keypad of a keyless entry system. The indicia 118 can comprise the keypad, which can have individual keys 170 that can be touched by a user in a predetermined sequence to unlock a lock mechanism (not shown) of the keyless entry system so that the user can grasp and pull the trim component 112 to release the door latch. The keys 170 can provide a visual indicator that identifies location(s) on the trim component 112 that the user must touch to operate the keyless entry system. The keys 170 can be associated with electronics in the form of a switch or sensor, such as a membrane switch, a capacitance sensor, or a field effect sensor, positioned behind the keys 170 and capable of sensing the presence of a user's finger when the user touches the keys 170. Thus, when the user touches the keys 170 in a predetermined sequence, the electronics can operably communicate with the lock mechanism to unlock the door.

The keys 170 can be viewable by the user when they are in the illuminated state, as illustrated in FIG. 12, and can be indiscernible when in the non-illuminated state. Alternatively, the keys 170 can be located on an escutcheon positioned behind the handle base 150 and the handle cap 160 or on an external panel of the door 114. The concept of utilizing the indicia 118 as a visual indicator that identifies one or more locations on the trim component 112 that a user must touch for activating electronics, such as the above mentioned switches and sensors, can be employed for applications other than keyless entry systems.

While the trim component 112 has been described and illustrated with respect to a strap-type door handle, the trim component 112 is not so limited. The trim component 112 can comprise other door handles suitable for a selected application.

Figure 13:
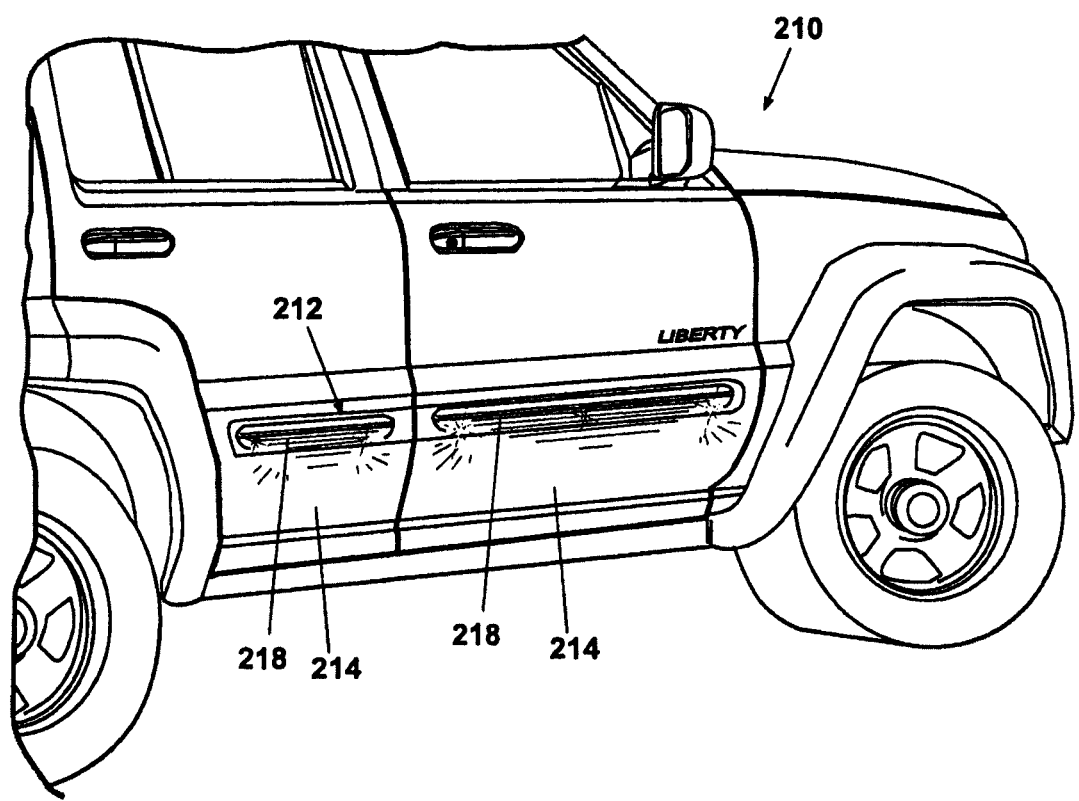
FIG. 13 is a perspective view of a motor vehicle including an external trim component wherein the indicia include safety lights.
Figure 14:
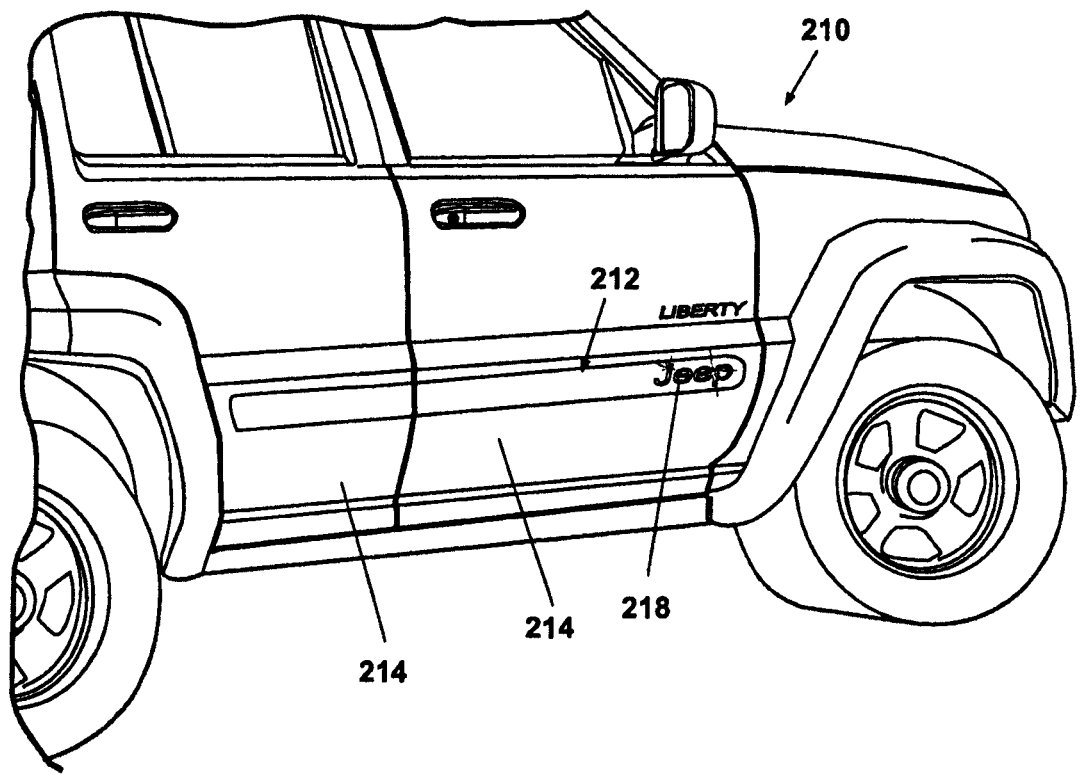
FIG. 14 is a perspective view similar to FIG. 13 wherein the indicia include a logo.
Figure 15:
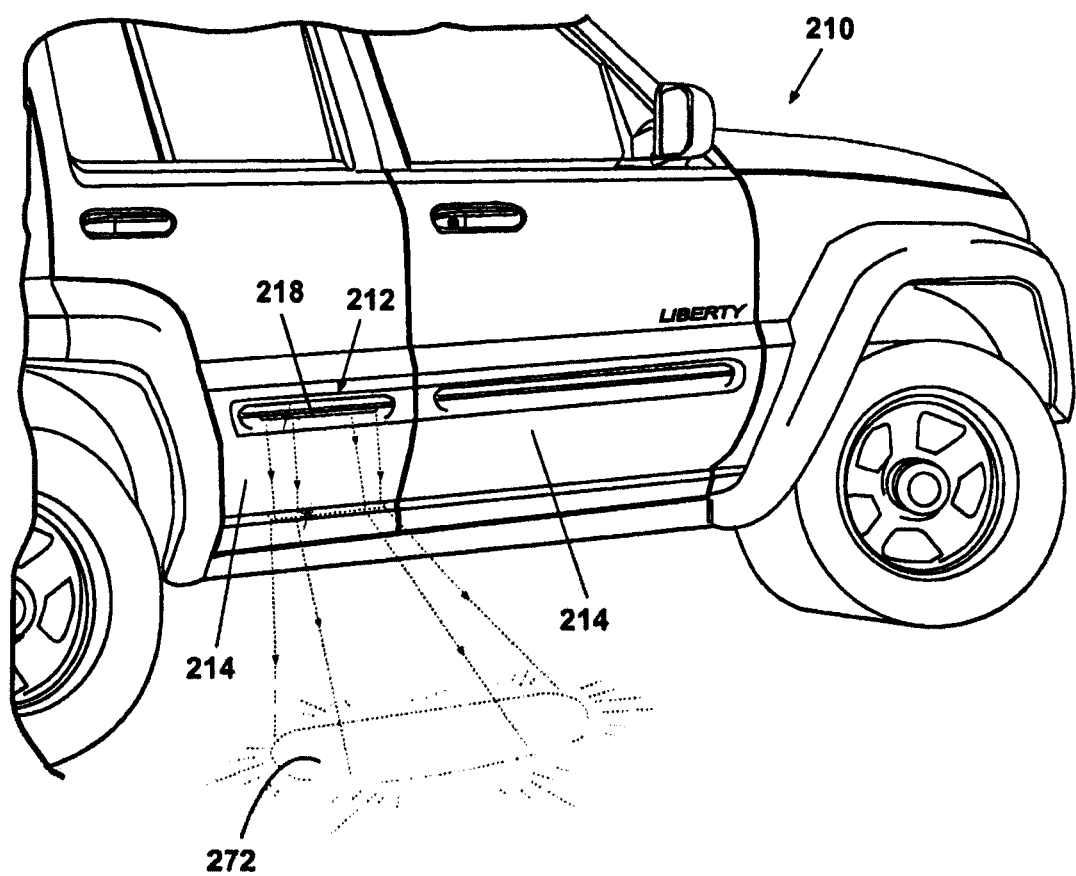
FIG. 15 is a perspective view similar to FIG. 13 wherein the indicia include a first embodiment of a puddle light.
Figure 16:
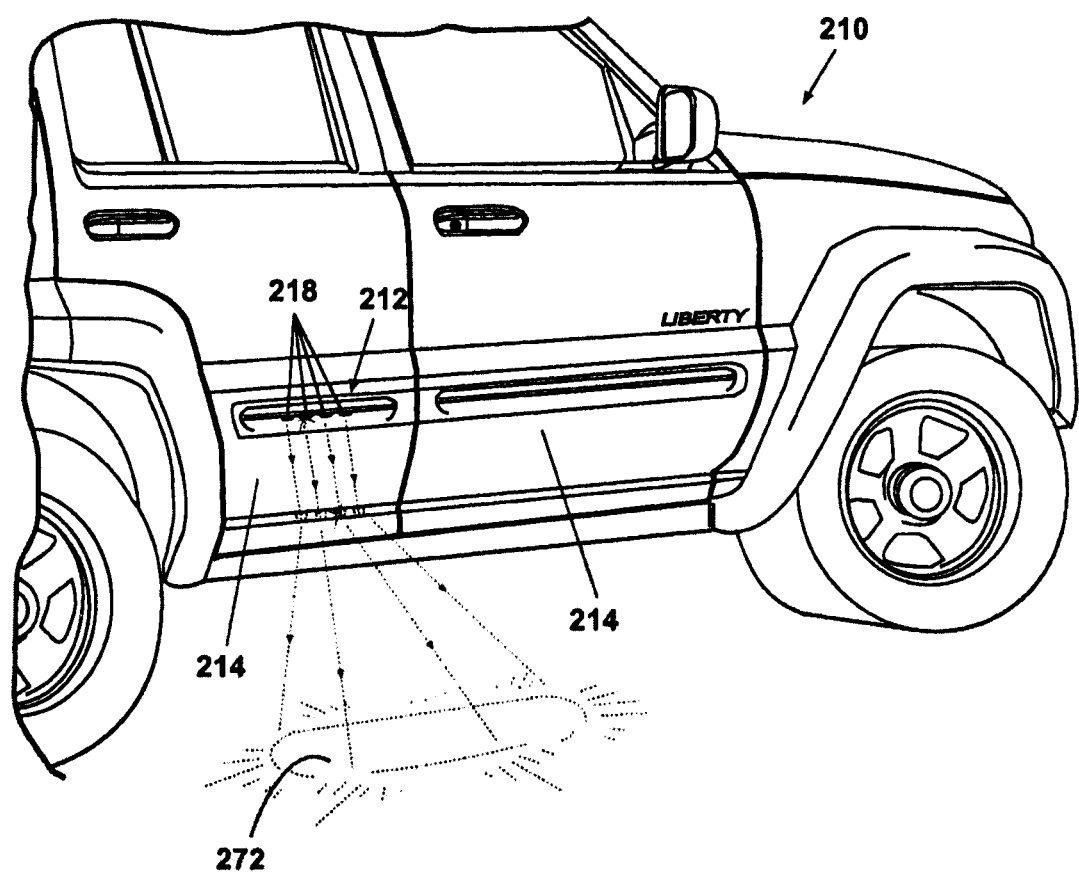
FIG. 16 is a perspective view similar to FIG. 15 wherein the indicia include a second embodiment of a puddle light.

Examples of other trim components with concealable indicia are illustrated in FIGS. 13-16. FIGS. 13-16 illustrate a vehicle 210 with a trim component 212 in the form of a bar integrated into side doors 214 of the vehicle 210. In FIG. 13, indicia 218 functions as a safety side light that increases the visibility of the vehicle 210 when in the illuminated state, and the indicia in FIG. 14 can be configured as a logo. Additionally, the indicia 218 of FIGS. 13 and 14 can also function as a turn signal indicator that flashes when the driver actuates a control lever inside the vehicle 210. In FIGS. 15 and 16, the indicia 218 can be configured as a security or puddle light that illuminates a ground area 272 adjacent the vehicle 210 when in the illuminated state. The illuminated state can be achieved upon actuation of a remote keyless entry fob or by any other suitable event. The indicia 218 of FIG. 15 can be a single, elongated puddle light, while the indicia 218 of FIG. 22 comprises a plurality of shorter disconnected segments that together form the puddle light.

The relative positioning of the substrate 30, the variably light-transmissive layer 32, and the mask 34 of the trim component 20, 120 can be selectively altered. For example, the mask 34 can be positioned forward of the substrate 30, or the variably light-transmissive layer 32 can be positioned between the substrate 30 and the mask 34. Alternatively, the variably light-transmissive layer 32 can be located on the internal surface 28 of the substrate, and the mask can be applied to the variably light-transmissive layer 32. The trim component 12, 120 does not have to include the mask 34. For example, light from the illumination source 36 can be transmitted through the entire substrate 30. Alternatively, the trim component can comprise an illumination source that focuses light on certain regions of the trim component. For example, an LCD display positioned behind the substrate 30 includes its own focused illumination source, and the LCD display becomes visible through the substrate 30 and the variably light-transmissive layer 32 when in the powered state, yet can be concealed by the variably light-transmissive layer 32 when not powered.

Exemplary flow charts of methods 300 for producing the combination substrate, finish, and mask of any of the embodiments of the trim component are illustrated in FIGS. 17A through 17H. The method 300 illustrated in FIG. 17A begins by applying the mask 34 to the substrate 30 in step 302. The mask 34 can be applied to the front side of the substrate 30 or to the rear side of the substrate 30. According to one embodiment, the mask 34 can be applied by positioning a stencil in the form of the indicia 18 on the substrate 30, spraying or otherwise applying an opaque coating, such as a black paint, to the substrate 30, and then removing the stencil. Next, the variably light-transmissive layer 32 can be applied to the substrate 30 on the side opposite the mask 34 in step 304. According to one embodiment, the variably light-transmissive layer 32 can be applied by coating the substrate 30 with paint, such as the aforementioned Ghost Chrome. In the case where the mask 34 can be applied to the rear side of the substrate 30, the variably light-transmissive layer 32 can be applied to the front side of the substrate 30. After the variably light-transmissive layer 32 is applied, a protective coating, such as a clear coat, can optionally be applied to the variably light-transmissive layer 32 in step 306. In the method 300 of FIG. 17A, steps 302 and 304 can occur in reverse order.

Figure 17A:
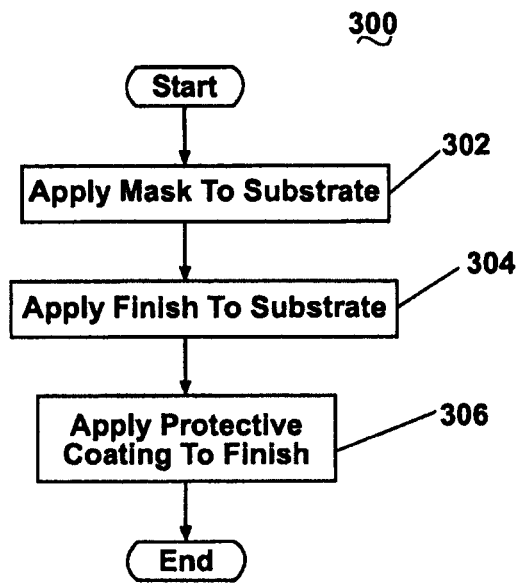
Figure 17B:
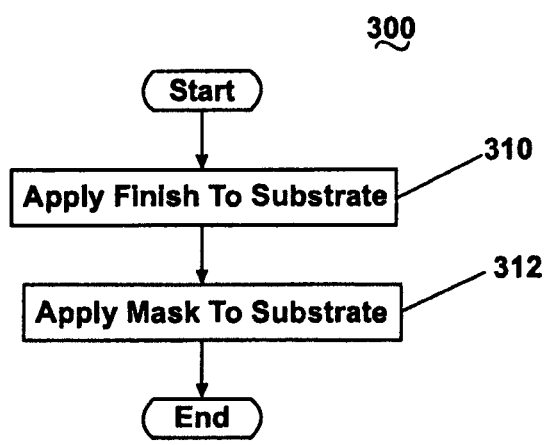

The method 300 described above produces the substrate 30 with the variably light-transmissive layer 32 and the mask 34 on opposite sides thereof. Alternatively, the method 300 can be altered as illustrated in FIG. 17B to produce the substrate 30 with the variably light-transmissive layer 32 and the mask 34 on the same side of the substrate 30. To begin the method 300 in FIG. 17B, the variably light-transmissive layer 32 can be applied to the substrate 30, such as on the rear side of the substrate 30, in step 310. According to one embodiment, the variably light-transmissive layer 32 can be applied to the rear side of the substrate 30 by coating the rear side of the substrate 30 with paint, such as the aforementioned Ghost Chrome. Next, the mask 34 can be applied to the variably light-transmissive layer 32 in step 312. According to one embodiment, the mask 34 can be applied by positioning a stencil in the form of the indicia 18 on the rear side of the variably light-transmissive layer 32, spraying or otherwise applying an opaque coating, such as a black paint, to the variably light-transmissive layer 32, and then removing the stencil.

Referring specifically to FIGS. 17C through 17H, methods 300 are outlined for producing the various forms of the trim component described above in relation to FIG. 25 through 31. More particularly, the method 300 of FIG. 17C begins with the application of an opaque basecoat on the "A" surface of the substrate in step 315. After the basecoat has dried, cured, or is otherwise ready to be worked upon further, part of the basecoat is then removed, such as by laser etching, for instance, to define the desired indicia in step 316.

Figures 17C, 17D:
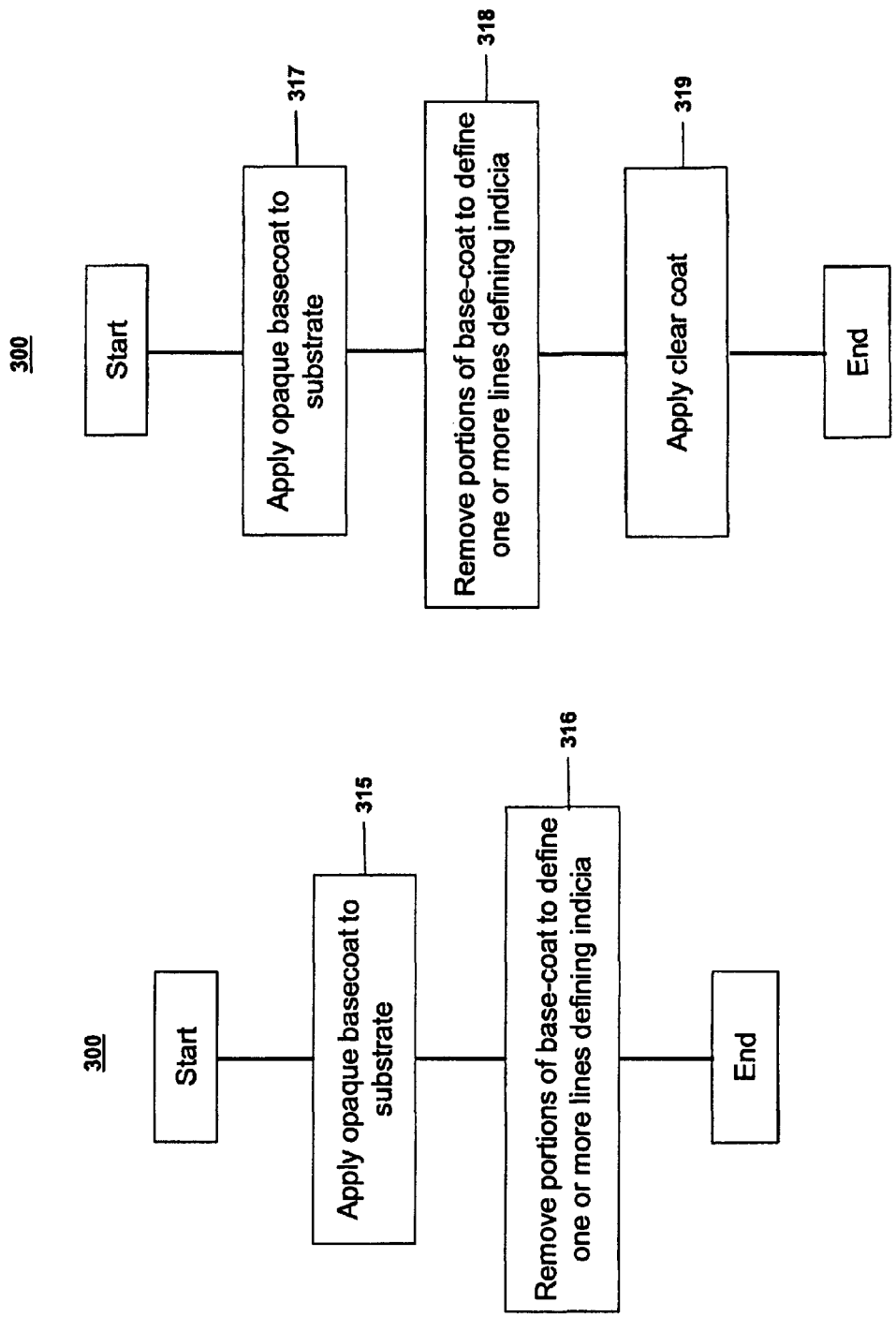

The method 300 of FIG. 17D begins with the application of an opaque basecoat on the "A" surface of the substrate in step 317. After the basecoat has dried, cured, or is otherwise ready to be worked upon further, part of the basecoat is then removed, such as by laser etching, for instance, to define the desired indicia in step 318. Upon completion of that step, a clear coat is applied over at least the indicia in step 319. As noted above, however, the clear coat may be applied more than just the indicia, up to and including the entire exterior surface of the trim component, as desired.

Figures 17E, 17F:
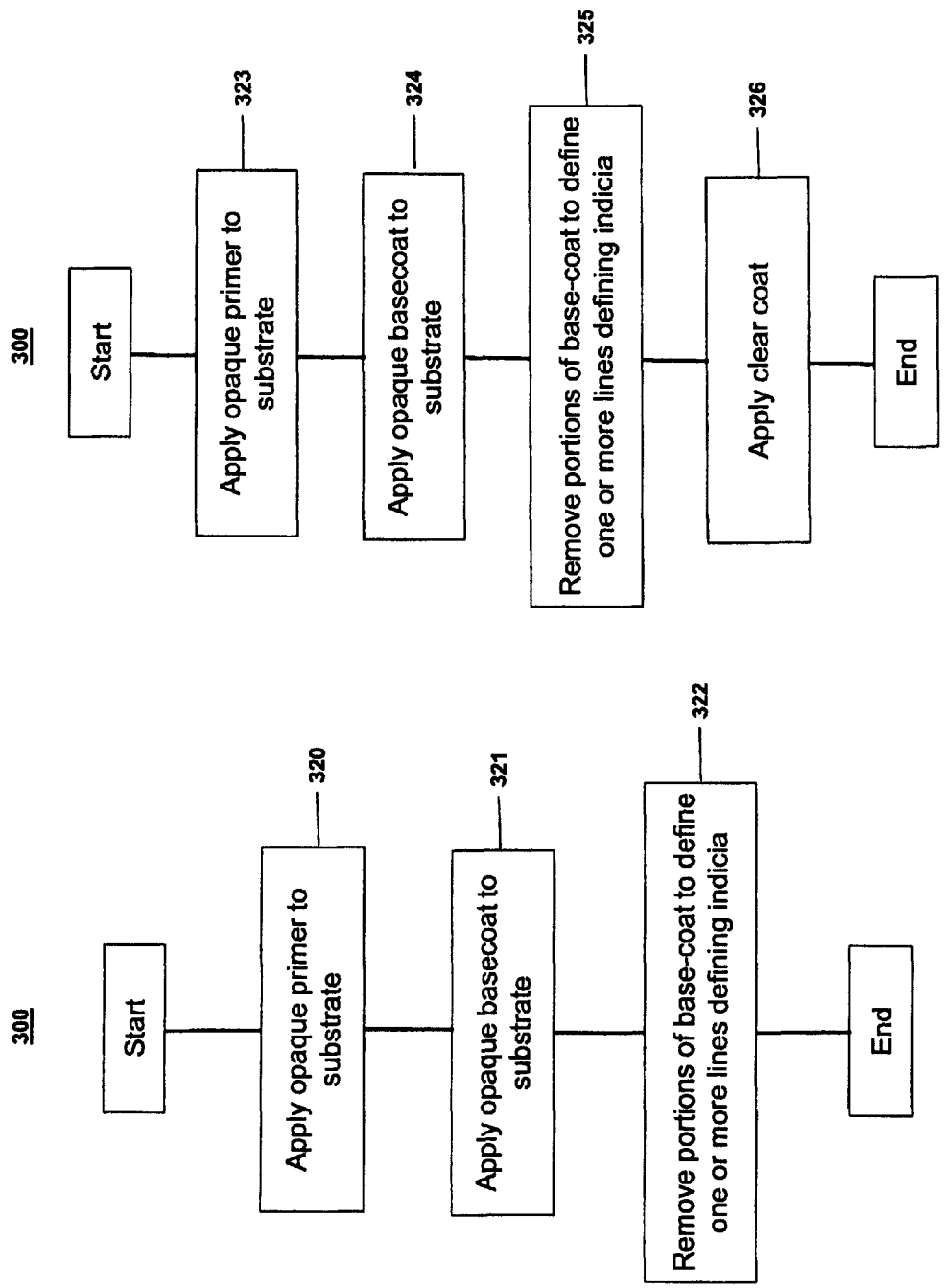

The method 300 of FIG. 17E begins with the application of an opaque primer on the "A" surface of the substrate in step 320. After the primer has dried, cured, or is otherwise ready to be worked upon further, an opaque basecoat is applied over the primer in step 321. After the basecoat has dried, cured, or is otherwise ready to be worked upon further, parts of the primer and basecoat are then removed, such as by laser etching, for instance, to define the desired indicia in step 322.

The method 300 of FIG. 17F begins with the application of an opaque primer on the "A" surface of the substrate in step 323. After the primer has dried, cured, or is otherwise ready to be worked upon further, an opaque basecoat is applied over the primer in step 324. After the basecoat has dried, cured, or is otherwise ready to be worked upon further, parts of the primer and basecoat are then removed, such as by laser etching, for instance, to define the desired indicia in step 325. Upon completion of that step, a clear coat is applied over at least the indicia in step 326. As noted above, however, the clear coat may be applied more than just the indicia, up to and including the entire exterior surface of the trim component, as desired.

The method 300 of FIG. 17G begins with the application of an opaque basecoat on the "A" surface of the substrate in step 327. After the basecoat has dried, cured, or is otherwise ready to be worked upon further, a clear coat is applied over the basecoat in step 328. After the clear coat has dried, cured, or is otherwise ready to be worked upon further, parts of the basecoat and clear coat are then removed, such as by laser etching, for instance, to define the desired indicia in step 329.

Finally, the method 300 of FIG. 17H begins with the application of an opaque primer on the "A" surface of the substrate in step 330. After the primer has dried, cured, or is otherwise ready to be worked upon further, an opaque basecoat is applied over the primer in step 331. After the basecoat has dried, cured, or is otherwise ready to be worked upon further, a clear coat is applied over the basecoat in step 332. After the clear coat has dried, cured, or is otherwise ready to be worked upon further, parts of the primer, basecoat and clear coat are then removed, such as by laser etching, for instance, to define the desired indicia in step 333.

The vehicular trim components with concealable indicia advantageously conceal indicia and an illumination source when in the non-illuminated state, and provide a captivating appearance to the indicia when in the illuminated state. As a result, indicia that do not contribute to the aesthetic appearance of the vehicle can be hidden when not in use. Additionally, the visually attractive indicia can function as effective advertising media and provide a vehicle owner with creative options for personalizing the vehicle.

Figure 18:
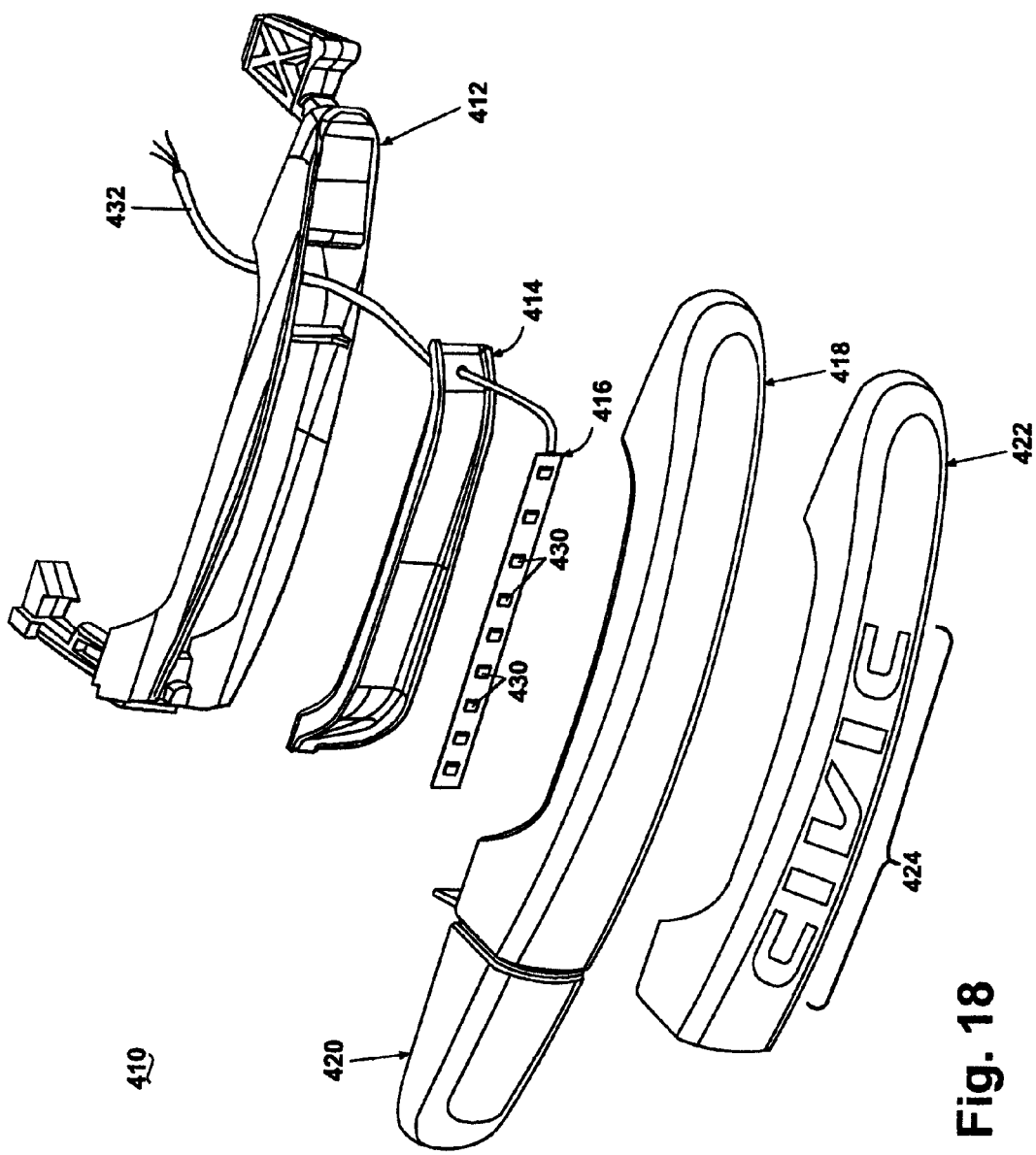
FIG. 18 is an exploded view of an external trim component with concealable indicia including a keyless entry pad according to a fourth exemplary embodiment of the invention.
Figure 19:
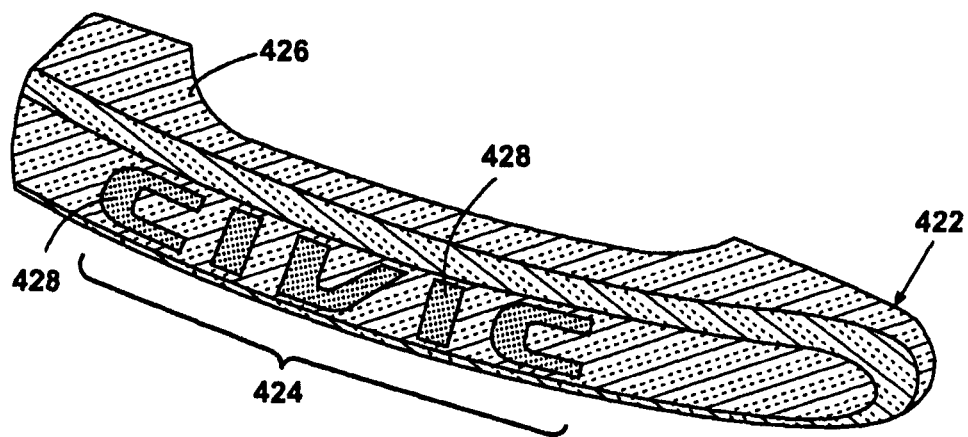
FIG. 19 is an enlarged perspective view of a portion of the external trim component of FIG. 18.

A further exemplary embodiment of the invention is illustrated in FIGS. 18 and 19. The embodiment of FIGS. 18 and 19 shares many of the features of the previously described embodiments, which will not be described in detail herein unless necessary for a complete understanding of the invention. FIG. 18 illustrates an exemplary exploded view of a door handle assembly 410 having an overlying selectively light transmissive indicia coating 422. The indicia coating 422 can incorporate a pattern 424, such as alphanumeric characters or symbols, which can be invisible when light, such as sunlight, impinges on the door handle assembly 410, but visible when backlit. The indicia coating 422 can be incorporated into the door handle assembly 410 so that, when the indicia are invisible, the door handle assembly 410 seamlessly blends in with the rest of the vehicle to which it is attached, as hereinafter described.

The door handle assembly 410 can comprise a substrate in the form of a grip cover 418 that mates with a handle housing 412 pivotally mounted to a vehicle door (not shown) and operatively coupled with a door latch (not shown) located inside the door. Together, the grip cover 418 and the handle housing 412 can form a grip that can be grasped by a user. The door handle assembly 410 can further include an illumination source holder 414 mounted to the handle housing 412 and sandwiched between the housing 412 and the grip cover 418. The illumination source holder 414 can support an illumination source assembly 416 comprising a plurality of illumination elements 430 to provide backlighting to the pattern 424. The illumination elements 430 can be any suitable source of light such as light emitting diodes (LEDs) that can be illuminated individually, in selected groups, or concurrently. An illumination source assembly wire harness 432 can extend through the handle housing 412 to be coupled with the vehicle power and control systems (not shown), for controlling the operation of one or more of the illumination elements 430.

The door handle assembly 410 can also comprise a bezel 420 mounted to the vehicle door adjacent to and coextensive with the grip cover 418.

The indicia coating 422 can comprise a specialty paint or finish that can be applied to the grip cover 418 through a coating process, such as a spray process, hydrographic or dip process, or other suitable coating process known in the art. The specialty paint or finish can comprise a selectively light transmissive coating that inherently renders the pattern 424 invisible in bright light until the illumination source assembly 416 is activated to backlight the pattern 424 and thereby render the pattern visible. Alternatively, the thickness of the indicia coating 422 can be carefully controlled to provide a selected level of light transmissivity. The indicia coating 422 can be applied in two different thicknesses, the lesser thickness being associated with the pattern 424, and the greater thickness being associated with the remaining area of the coating 422.

The selected pattern 424 to be rendered visible when backlit can also result from modifications of portions of the indicia coating 422 to enhance its light transmissivity associated with such pattern. For example, the indicia coating 422 can be removed entirely in the selected pattern after the coating 422 has been applied over the entire substrate, and replaced with a more light transmissive coating. The application of the indicia coating 422 can be controlled, such as through the use of stencils or paint masks, so that no indicia coating 422 is applied over the pattern. The pattern can subsequently be coated with a more light transmissive coating. The indicia coating 422 can also be adapted to reflect light that impinges on the door handle assembly 410, thereby enhancing the concealment of the indicia when not backlit.

As illustrated in FIG. 19, the indicia coating 428 corresponding to the selected patterns 424 can be partially removed or incised, such as by scoring, fine crosshatching, stippling, etching, carving, and the like, to enhance its transmissivity, while maintaining the opacity or masking capabilities of the remaining indicia coating 422. Other characteristics that can be controlled to control the transmissivity of selected patterns in the indicia coating 422 include paint color, the color of the illumination elements 430, the intensity of the light emitted from the illumination elements 430, and the like.

The use of a specialty paint or finish as described above can eliminate the need for a separate mask to block light from the illumination source assembly 416 in order to illuminate the selected characters or symbols 424. A single layer serving as both a finish coat and a mask layer can simplify the process of fabricating a door handle assembly 410 by eliminating an extra layer while producing a door handle assembly that can blend in with the vehicle's overall color and finish, thereby accelerating production and reducing costs.

Figure 20:
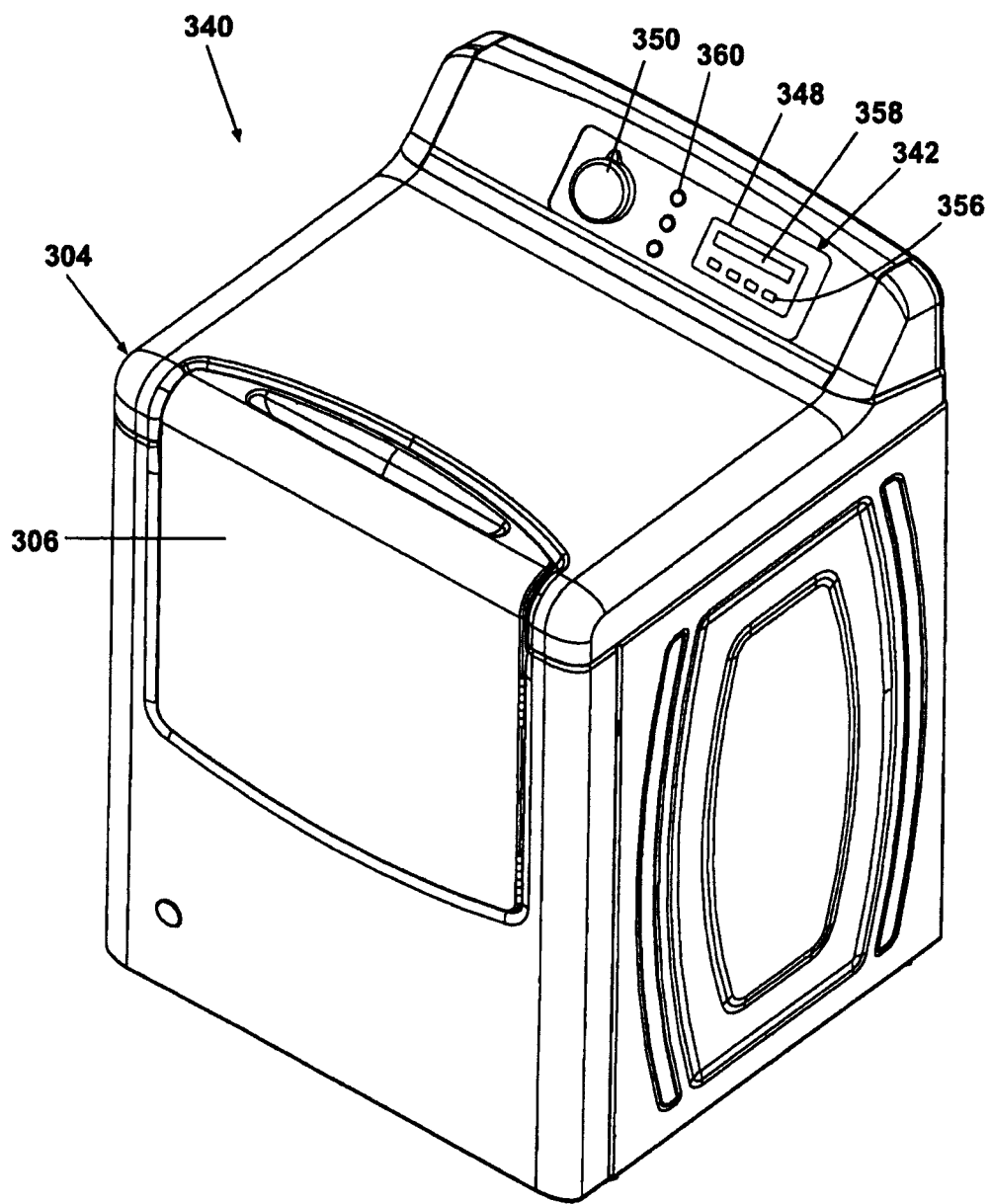
FIG. 20 is a perspective view of a household appliance including a trim component with concealable indicia according to a fifth exemplary embodiment of the invention.

The invention is not limited to vehicle door handles, or to vehicles in general. The invention can also be incorporated into items such as appliances. FIG. 20 illustrates another exemplary embodiment of the invention comprising an automatic clothes dryer 340 including a cabinet 344 having a door 346 providing access to an interior drum (not shown). The clothes dryer 340 can also comprise a substrate in the form of a control panel 342 mounted to an upper portion of the clothes dryer 340 and comprising a user interface 348. The user interface 348 can have a plurality of operational keys 356 and a display 358. The control panel 342 can also include a control knob 350 and control buttons 360. The knob, keys, buttons, display, and other interactive control devices can provide information and control functionality to a user.

The keys 356, control knob 350 and control buttons 360 can comprise flush-mounted, soft-touch control wheels, buttons, and keys, or control wheels, buttons, and keys utilizing sensors, such as field effect sensors or capacitance sensors, that can be activated when a user's finger is in the vicinity of the sensor, and which can more readily accommodate an indicia coating.

The control panel 342, including the user interface 348, control knob 350, and control buttons 360, can be adapted with an indicia coating so that, when the clothes dryer 340 is not in use, the control panel 342 can be effectively concealed, and when the clothes dryer 340 is in use, the control panel 342, user interface 348, control knob 350, and control buttons 360 can be backlit, rendering them visible to a user of the appliance. It may be necessary to utilize an illumination source capable of sufficiently illuminating the control panel 342, user interface 348, control knob 350, and control buttons 360 in bright light, such as daylight or conventional interior lighting.

The illumination source can comprise an illumination source holder supporting an illumination source assembly comprising a plurality of illumination elements, generally as described above. It is assumed that configuration of these elements for use in an appliance control panel rather than a vehicle door handle assembly is within the abilities of a person having an ordinary level of skill in the art.

Figure 21:
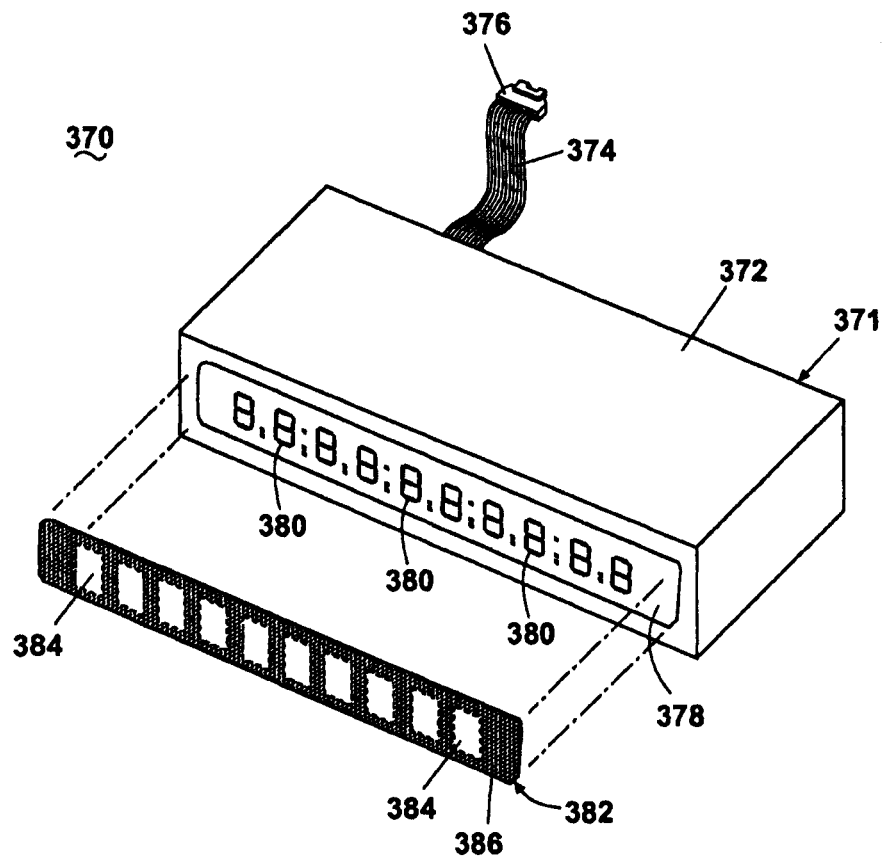
FIG. 21 is a perspective view of a 7-segment display assembly with concealable indicia according to a sixth exemplary embodiment of the invention.

FIG. 21 illustrates another exemplary embodiment of the invention wherein the illumination source can comprise a known 7-segment display assembly 370, which provides both illumination and information. The display assembly 370 can comprise a 7-segment display console 371 and an indicia coating 382. The display console 371 can comprise an enclosure 372 containing at least one illuminating 7-segment display indicia 380, associated electronic control circuitry, power subassemblies, and the like, coupled with an electrical system through a wire harness 374 and connector 376. A substrate in the form of a display panel 378 extending along one wall of the enclosure 372 can incorporate or overlay one or more indicia 380, such as alphanumeric characters. The indicia coating 382 having a selected color and finish can be applied to the display panel 378 to conceal the 7-segment display and blend the display console 372 into adjacent panels. Alternatively, the indicia coating 382 can be applied directly over the 7-segment display indicia 380. The indicia coating 382 can incorporate a plurality of transmissive portions 384, each aligned with indicia 380, and surrounded by a mask portion 386 generally as described above. The display assembly 370 can be incorporated into a motor vehicle component, an appliance, signage, signaling devices, and the like.

For components or applications in which the indicia are only observed or only convey information, the indicia coating configurations described above can be utilized. However, if the indicia are to additionally facilitate the selection of functionality, such as a keypad, the configuration can incorporate one or more functionality switches, such as a field effect sensor, a capacitance sensor, a pressure pad, a multi-touch screen, and the like.

The control panel can be configured with an illumination source for each selectable control. Utilizing, for example, a field effect sensor adapted so that touching any part of the control panel will actuate the illumination sources, specific indicia associated with each selectable control will be visible and can be selectively actuated by the user. Individual indicia can also be actuated by a field effect sensor, a multi-touch display panel, and the like. The control panel electronics can be adapted so that, after the user has completed the actuation of controls, the indicia and illumination sources not associated with the selected controls can be automatically switched off. Informational indicia associated with a selected operation or function, such as water temperature, laundry load weight, selected wash cycle, and the like, can continue to be illuminated. A seven-segment display assembly may be particularly well suited for displaying such information. Thus, for example, during use of the appliance, only those indicia associated with a selected operation or function will remain illuminated. Those indicia not associated with a selected operation or function will be concealed, and the overlying finish layer will "blend in" with the adjoining surfaces.

The selectively light transmissive indicia coating as described herein can also be utilized for brake lights, parking lights, turn indicators, and the like. The indicia coating can be adapted for light transmissivity in areas corresponding to the brake lights, parking lights, turn indicators, etc. the remainder of the indicia coating can be opaque, to serve as a mask portion. In ambient light, the brake lights, parking lights, turn indicators, etc. will be concealed behind the indicia coating, with the entire assembly having a color and finish blending in with the color and a finish of adjacent portions of the vehicle. However, when braking, using the turn indicators, or actuating the braking lights, light will be transmitted through the transmissivity areas.

The indicia coating can be used with lock/unlock indicators incorporated into the vehicle door or other panels. When the door is unlocked, either with a key, a wireless control such as a key fob, or a code-based keyless entry system, a light element can be briefly activated to indicate the locked/unlocked condition; when deactivated, the light element can be concealed behind the indicia coating, which will blend in with adjacent panels.

Other applications can include dome lights, supplemental exterior area lighting, license plate illumination, and the like. The trim component described herein can comprise a part of other vehicles, such as aircraft, watercraft, motorcycles, personal watercraft such as SEA-DOOS® and WAVERUNNERS®, all-terrain vehicles, and the like. The trim component can also comprise a part of any other appliance, such as clothes washers, dishwashers, refrigerators, freezers, laundry pedestals, and portable appliances, such as vacuum cleaners, countertop mixers, blenders, coffeemakers, radios, music systems, and food processors. Virtually any actuatable apparatus that incorporates informational displays or controls can incorporate the trim component, as generally described herein. The use of the selectively light transmissive indicia coating can enhance the styling and appearance of such apparatus by concealing indicia and illumination sources until the illumination source is actuated, and the indicia can be revealed. The use of a single layer that can be adapted as both a mask portion and an unmasked portion can simplify the fabrication and finishing of the apparatus, enhance the appearance of the apparatus, and reduce the costs of fabrication.

According to another embodiment of the invention, the variably light-transmissive layer 32 can be integrated with the substrate 30. For example, the substrate 30 can be molded of a polymer having a selected color, and the wall thickness of the substrate 30 can be selected to achieve the optical characteristics required of the variably light-transmissive layer 32. Thus, the substrate 30 in this case can also function as the variably light-transmissive layer 32 for the trim component 12.

Alternatively, the mask 34 can be produced with a two shot molding process, wherein multiple resins can be injected into a single mold to create the masked and unmasked portions 46, 48. In a related process, insert/over molding, a solid clear component can be inserted into a mold, and opaque material, such as resin, can be injected around the clear component. The portions of the clear component not covered by the opaque material can form the unmasked portion 48, and the opaque material can form the masked portion 46. Alternatively, the mask 34 can be made by molding a single component, which can be the substrate 30, as described above, or a component separate from the substrate 30, having portions with walls that can be thin relative to the rest of the molding to form the unmasked portion 48.

Figure 22:
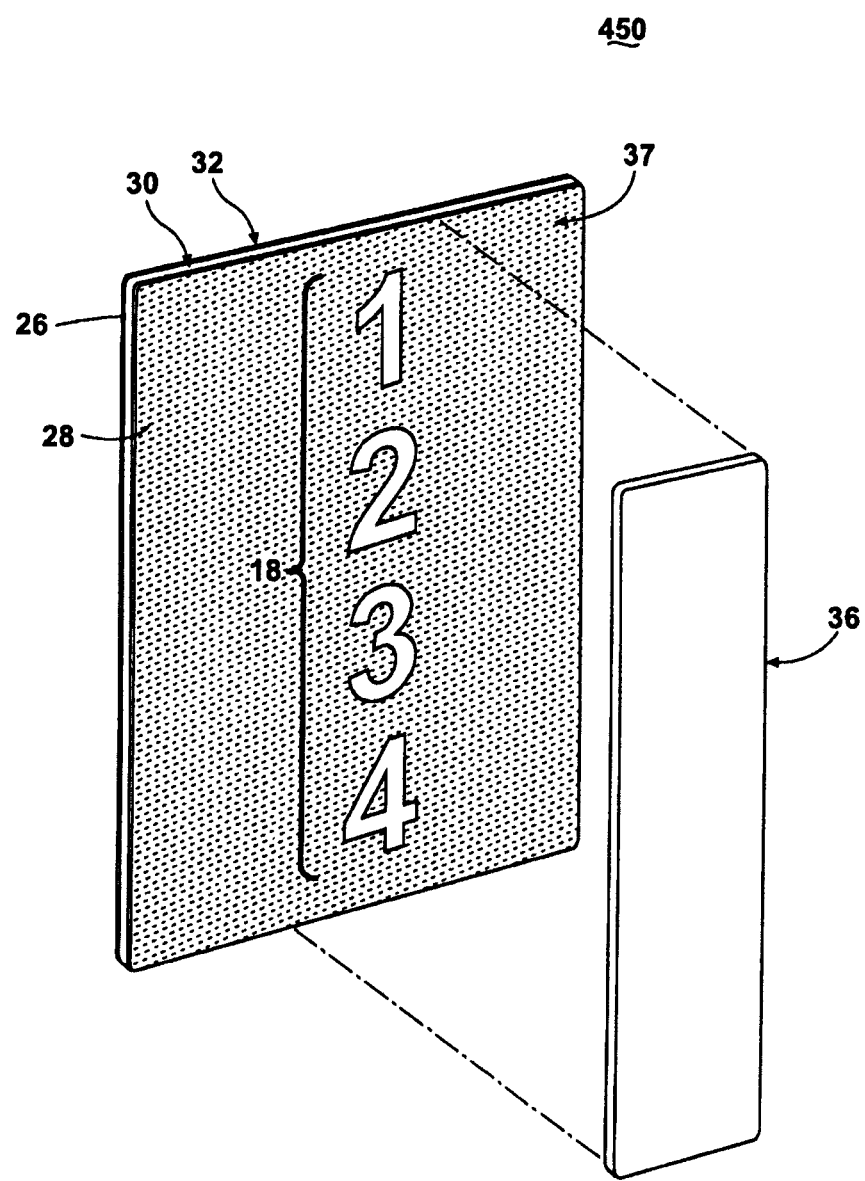
FIG. 22 is a partially exploded schematic view of the fundamental elements of an external trim component with a substrate, a controlled-illumination coating on the "A" surface, an insert-molded mask on the "B" surface with cut or printed indicia, and an illumination source according to a seventh exemplary embodiment of the invention.

A further exemplary embodiment of the invention is illustrated in FIG. 22 comprising a schematic trim component 450. The embodiment of FIG. 22 shares many of the features of the previously-described embodiments, which will not be described in detail herein unless necessary for a complete understanding of the invention. Specifically, the embodiment of FIG. 22 is identical to the embodiments of FIGS. 5A and 5B, except that the trim component structure 450 can include an insert molded mask 37. Thus, the basic trim component structure 450 can comprise a substrate 30, an overlying variably light-transmissive layer 32, and an illumination source 36, with the insert molded mask 37 located intermediate the substrate 30 and the illumination source 36.

The insert molded mask 37 can include a pre-formed secondary substrate, a conventional rigid printed circuit board, a flexible film, a flexible printed circuit board, and the like, having selected indicia. As an example, an insert moldable translucent film can first be printed to define opaque and translucent areas corresponding to selected indicia. Alternatively, an opaque film can be prepared with laser cut or die-cut areas defining the selected indicia. The prepared piece can then be placed into an injection molding tool so that it can be molded to the "B" surface of the substrate 30. The substrate material can be injected into the molding tool against the insert molded mask 37, and allowed to harden. Thus, the mask 37 will be integrated with the molded substrate 30, requiring no subsequent operations to provide indicia for the trim component 410. The variably light-transmissive layer 32 can be applied to the "A" surface 26 of the substrate 30 to complete the trim component structure 450, thereby rendering the indicia 18 indiscernible when ambient light, such as sunlight, impinges on the trim component 410 without backlighting. When backlit, however, the indicia 18 can be discernible.

Figure 23:
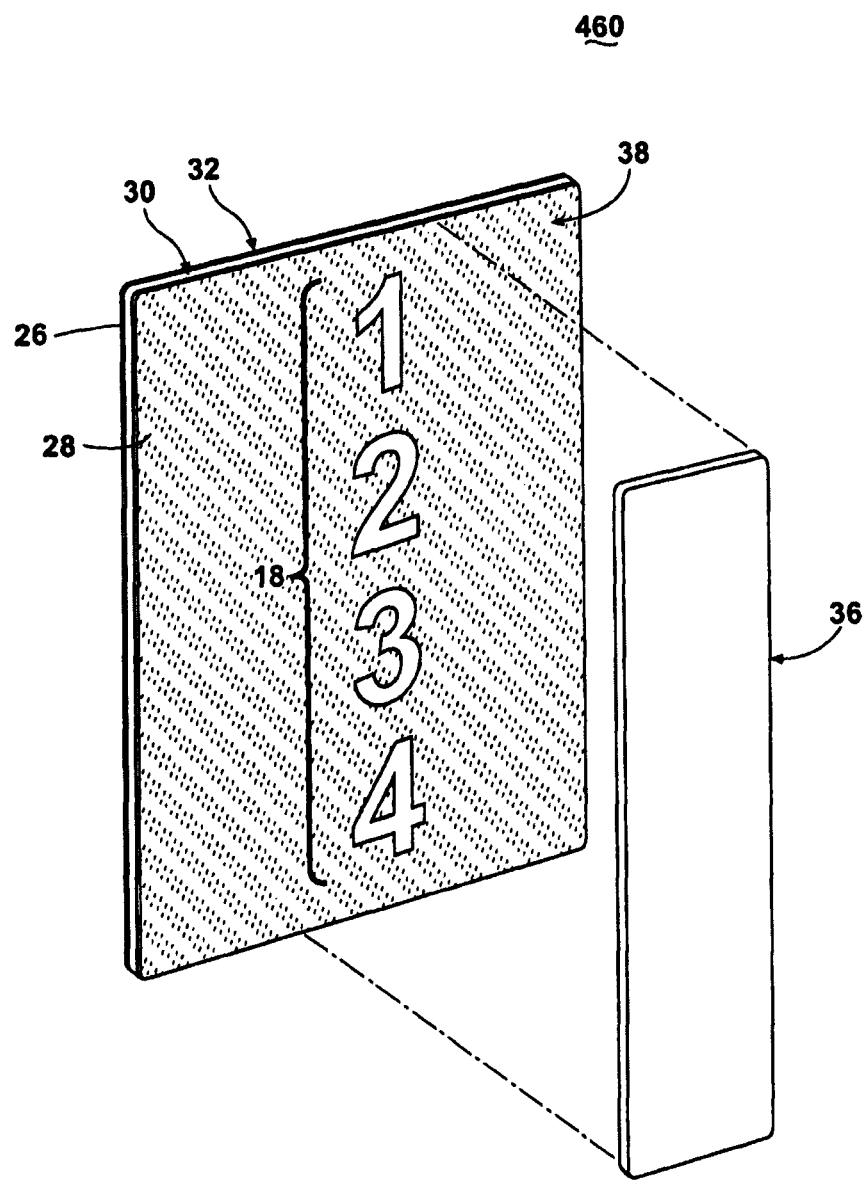
FIG. 23 is a partially exploded schematic view of the fundamental elements of an external trim component with a substrate, a controlled-illumination coating on the "A" surface, a flexible printed circuit board on the "B" surface with inked, masked, or clear indicia thereon, and an illumination source according to an eighth exemplary embodiment of the invention.

Another exemplary embodiment of the invention is illustrated in FIG. 23 comprising a schematic trim component 460. The embodiment of FIG. 23 shares many of the features of the previously-described embodiments, which will not be described in detail herein unless necessary for a complete understanding of the invention. Specifically, the embodiment of FIG. 23 is identical to the embodiments of FIGS. 5A, 5B, and 22, except that the trim component structure 460 can include a flexible PCB mask 38 to enable the trim component structure 460 to be selectively fabricated with a non-rectilinear configuration. Thus, the basic trim component structure 460 can comprise a substrate 30, an overlying variably light-transmissive layer 32, and an illumination source 36, with the flexible PCB mask 38 located intermediate the substrate 30 and the illumination source 36.

The flexible PCB mask 38 can be fabricated of a material such as polymide, transparent conductive polyester, or other suitable material with one or more electronic circuits (not shown) printed on a flexible film. The flexible PCB mask 38 can be fabricated in a manner similar to those of previous embodiments. For example, the flexible PCB mask 38 can be inked with opaque and translucent areas to define indicia 18. The transmissivity of the translucent areas can be controlled by factors such as the presence or absence of ink, the type of ink utilized, the thickness of the ink, and the like. Alternatively, printing of opaque and translucent areas in selected indicia can be controlled by masking during the printing process. The flexible PCB mask 38 can be fabricated of a flexible opaque film, with indicia 18 defined by selectively removing portions of the film. In yet another alternative, a flexible film that can be pre-printed with opaque and translucent areas defining indicia 18 can be joined to the flexible PCB to form the flexible PCB mask 38.

The flexible PCB mask 38 can be applied to the "B" surface 28 of the substrate 30. It should be understood that, if the trim component structure 460 is to have a non-rectilinear configuration, the substrate 30 and illumination source 36 can be fabricated to accommodate such configuration prior to application of the flexible PCB mask 38 to the "B" surface 28. Alternatively, the flexible PCB mask 38 can be insert molded with the substrate 30, as described previously herein. The substrate 30, variably light-transmissive layer 32, flexible PCB mask 38, and illumination source 36 can function in generally the same manner as in the previous embodiments with respect to the indicia 18 and its discernibility to an observer under differing conditions of illumination.

Figure 24:
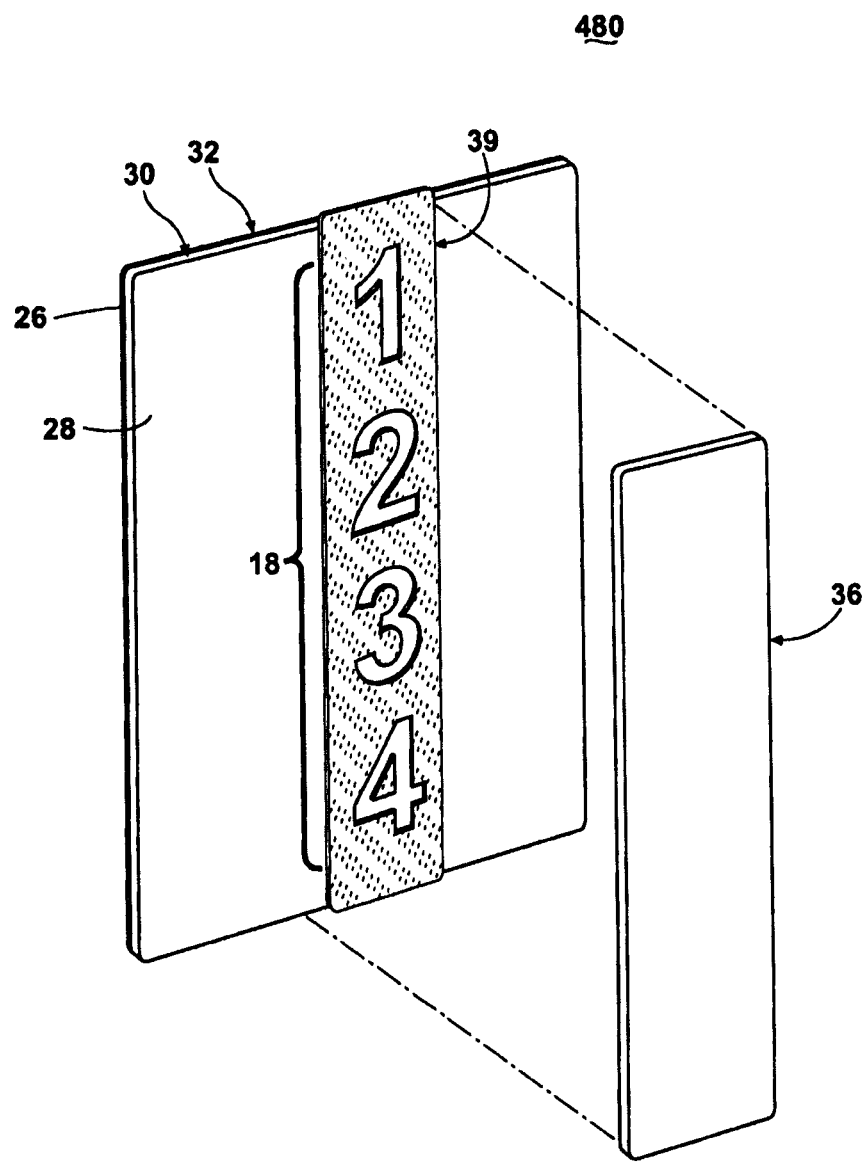
FIG. 24 is a partially exploded schematic view of the fundamental elements of an external trim component with a substrate, a controlled-illumination coating on the "A" surface, a printed circuit board on the "B" surface with inked, masked, or clear indicia thereon, and an illumination source according to an ninth exemplary embodiment of the invention.
Figure 25:
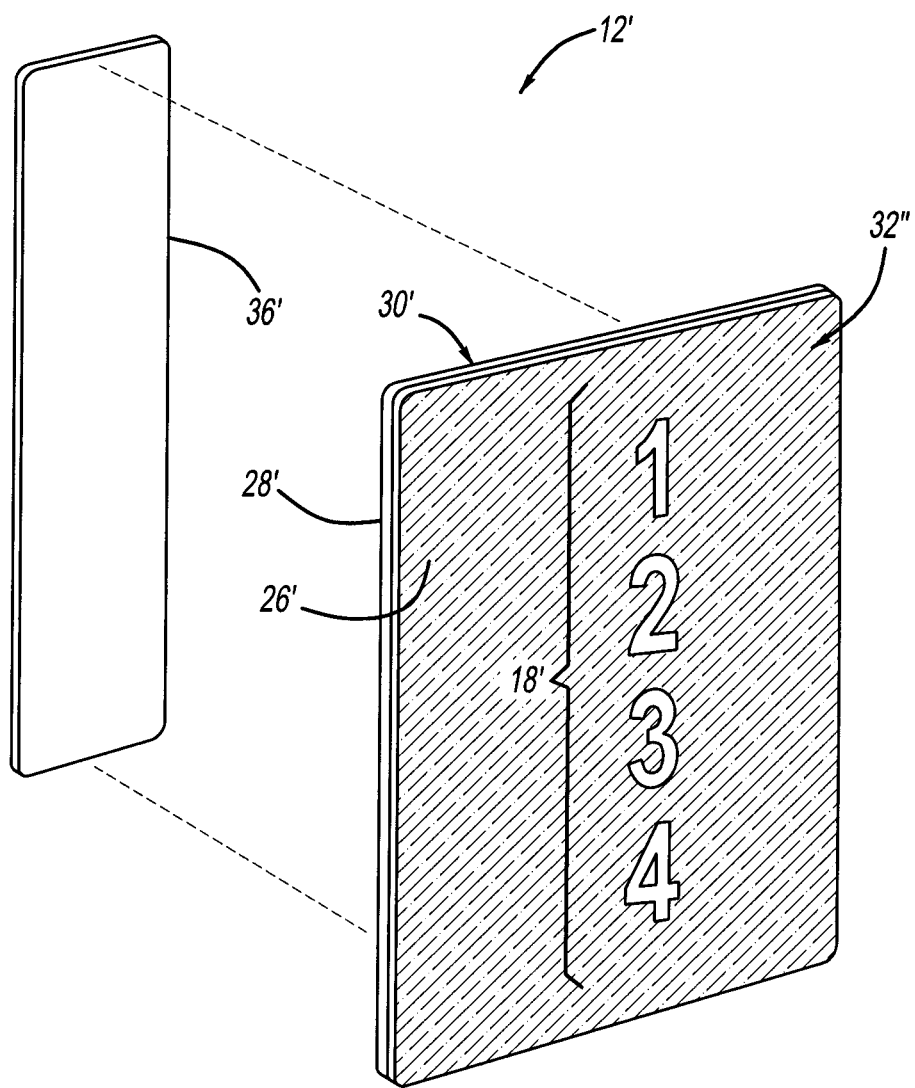
FIG. 25 is a partially exploded schematic view of the fundamental elements of an external trim component illustrating a substrate, a coating on the "A" surface, indicia defined on the "A" surface, and an illumination source.
Figure 26:
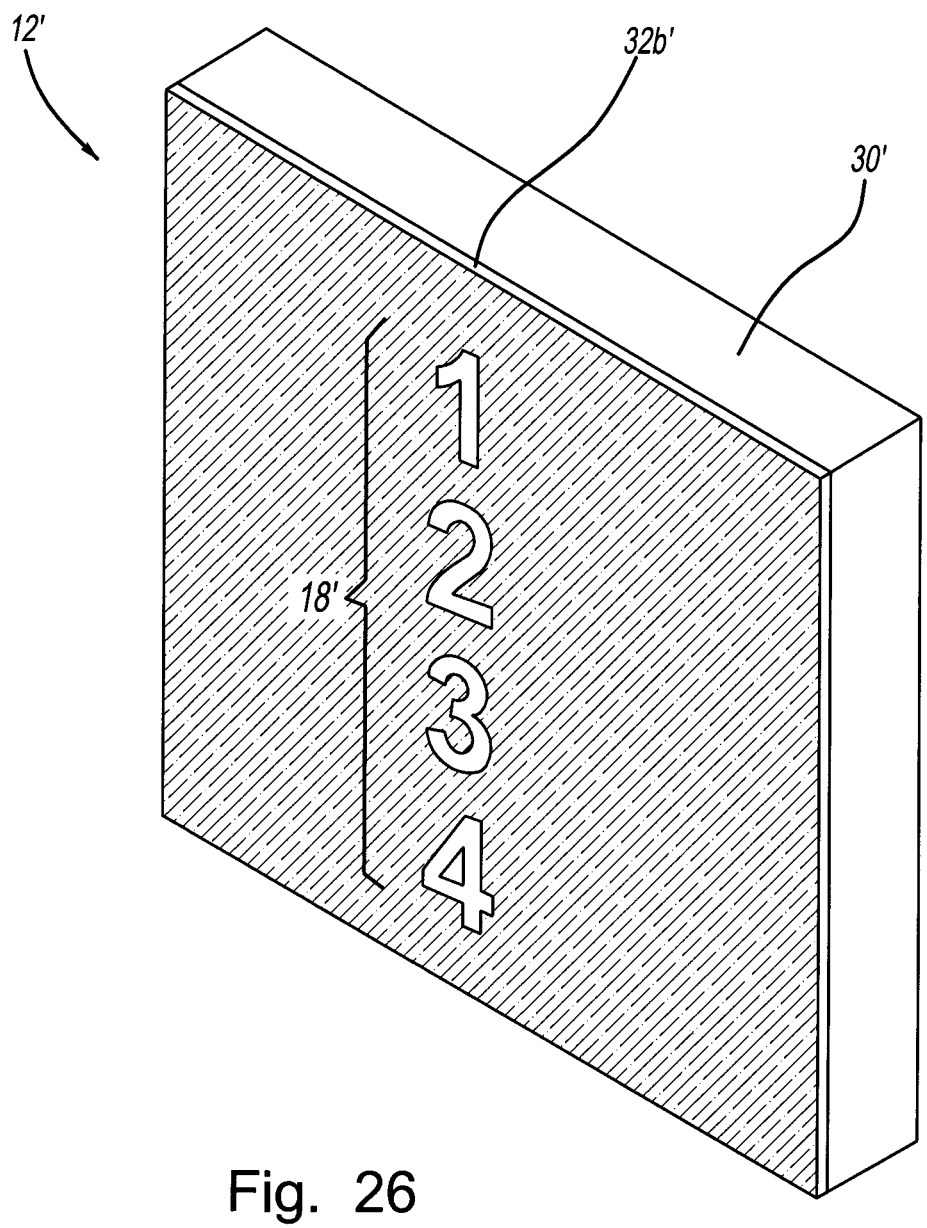
FIGS. 26 through 31 are detailed schematic views of alternative forms of the trim component according to FIG. 25.
Figure 27:
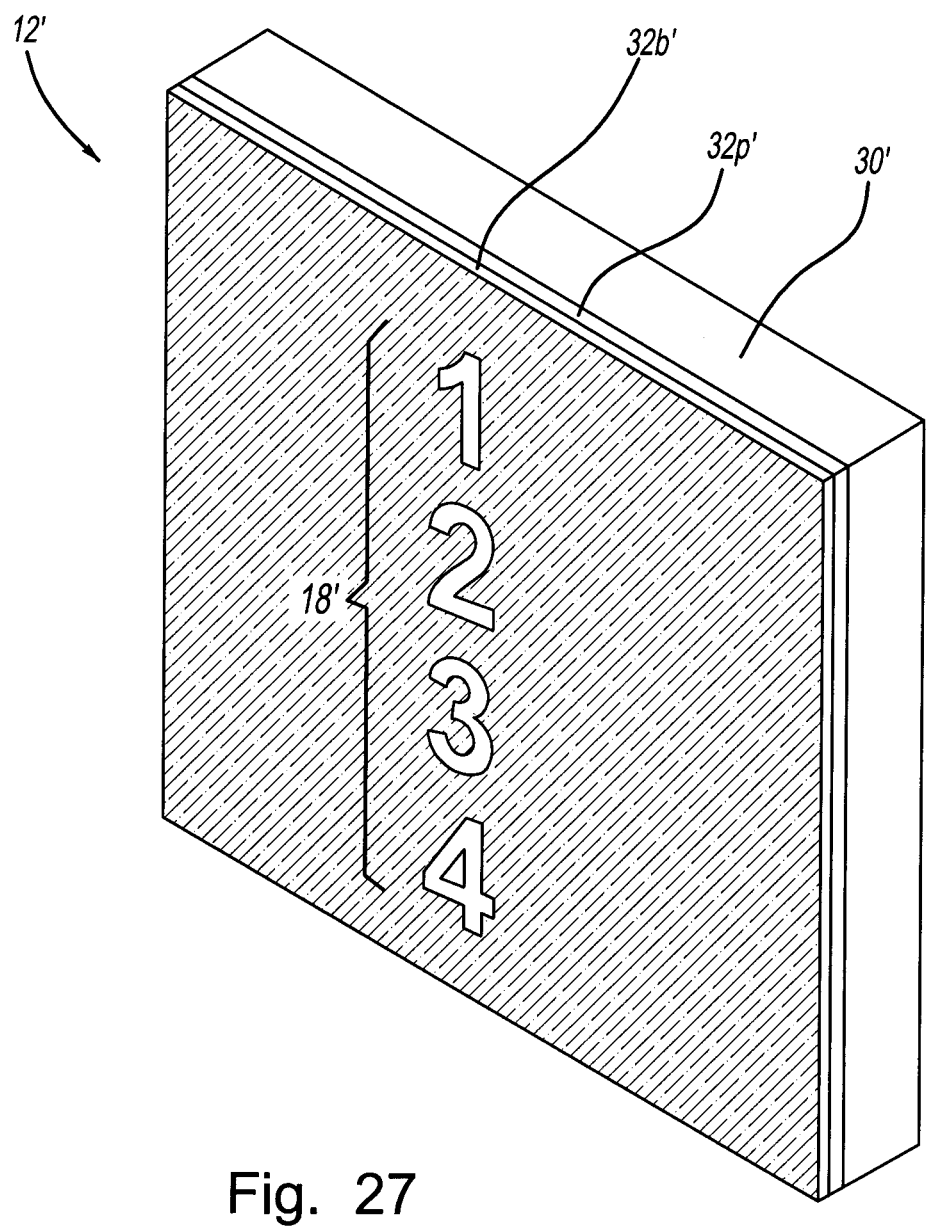
Figure 28:
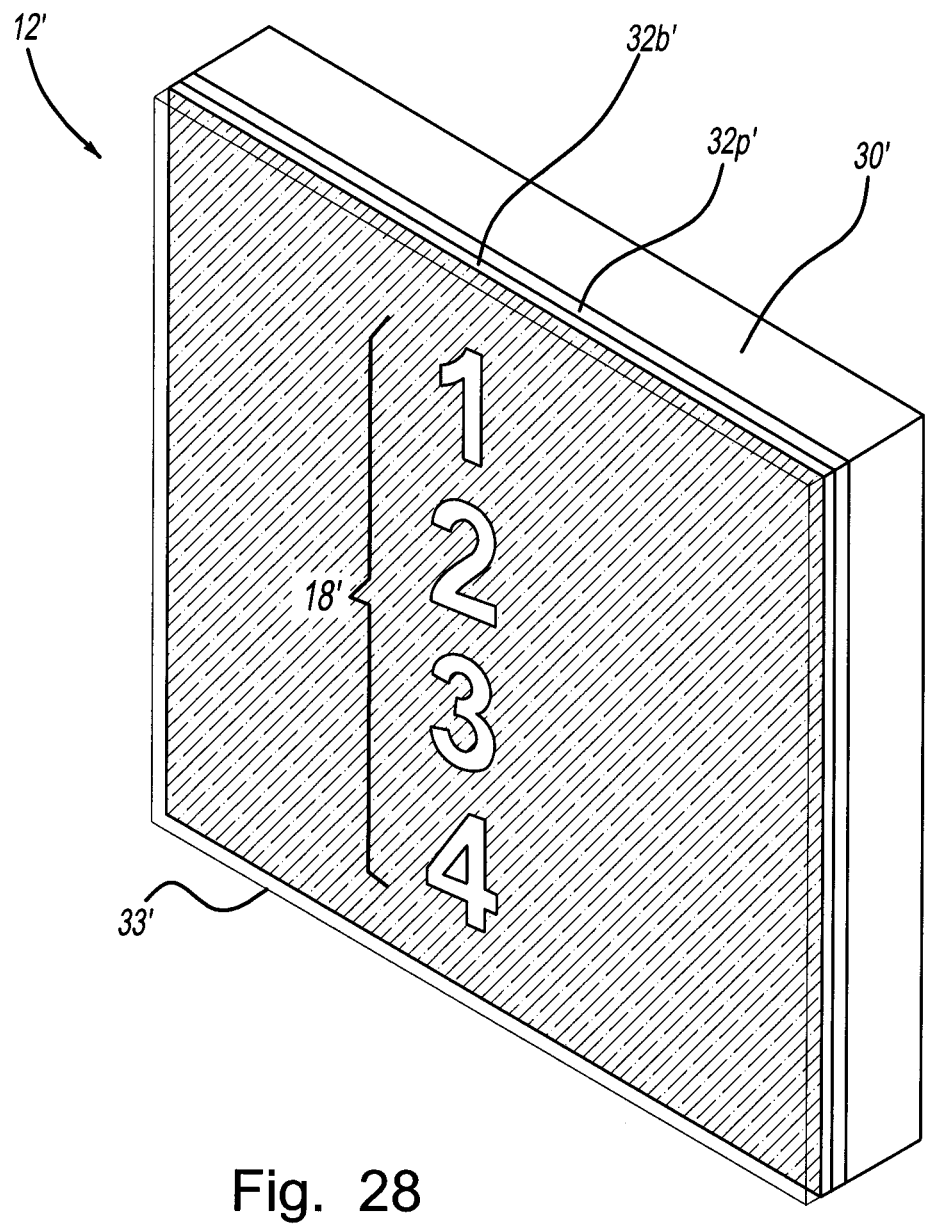
Figure 29:
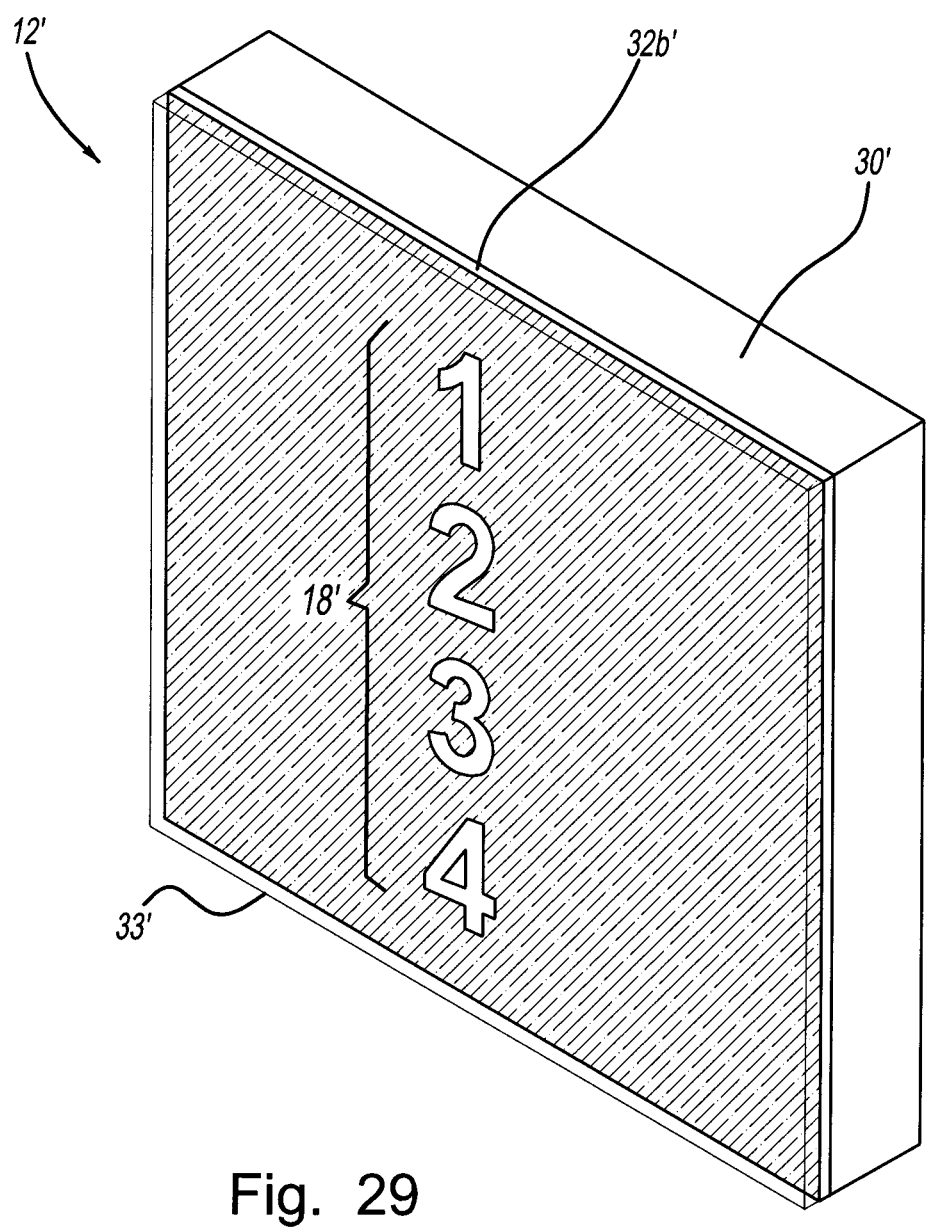
Figure 30:
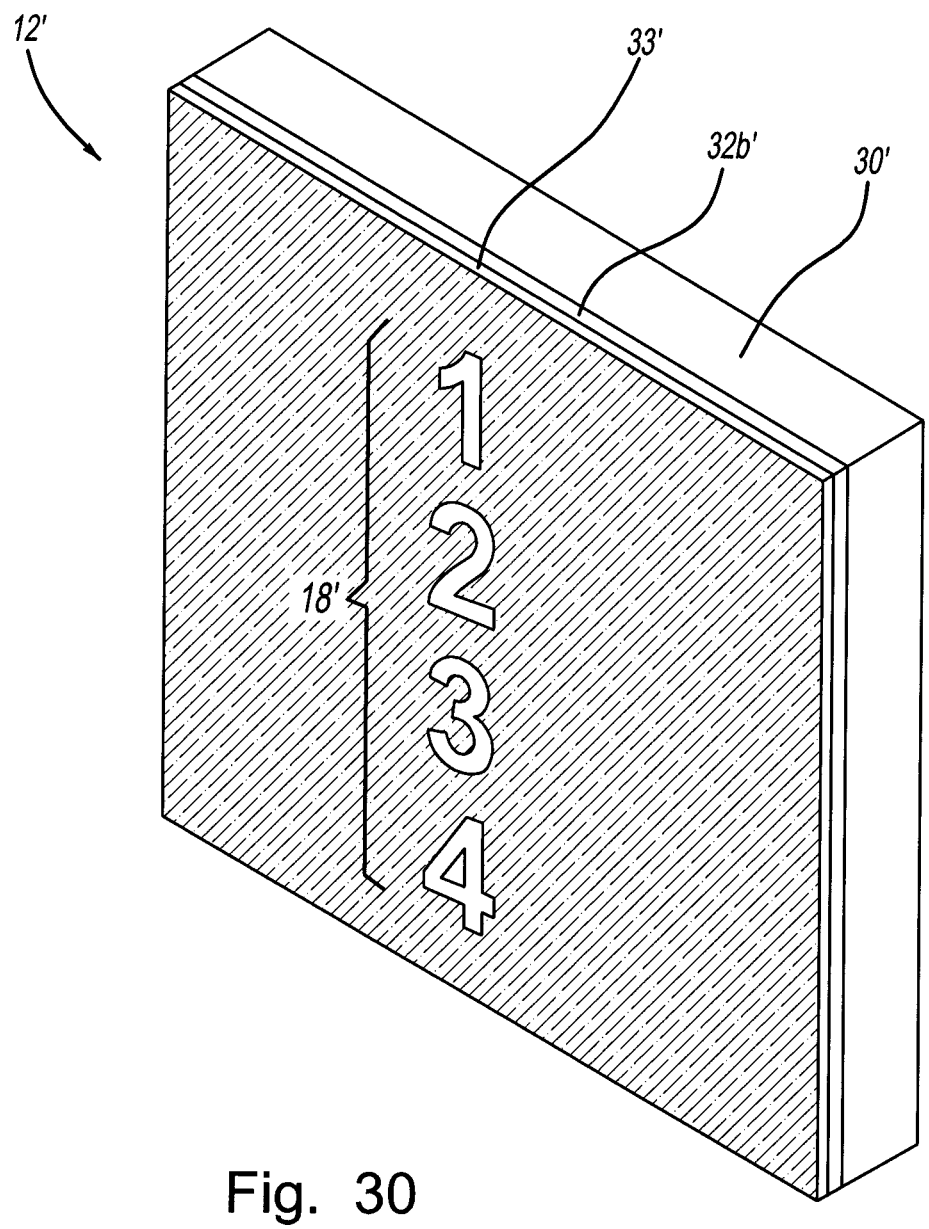
Figure 31:
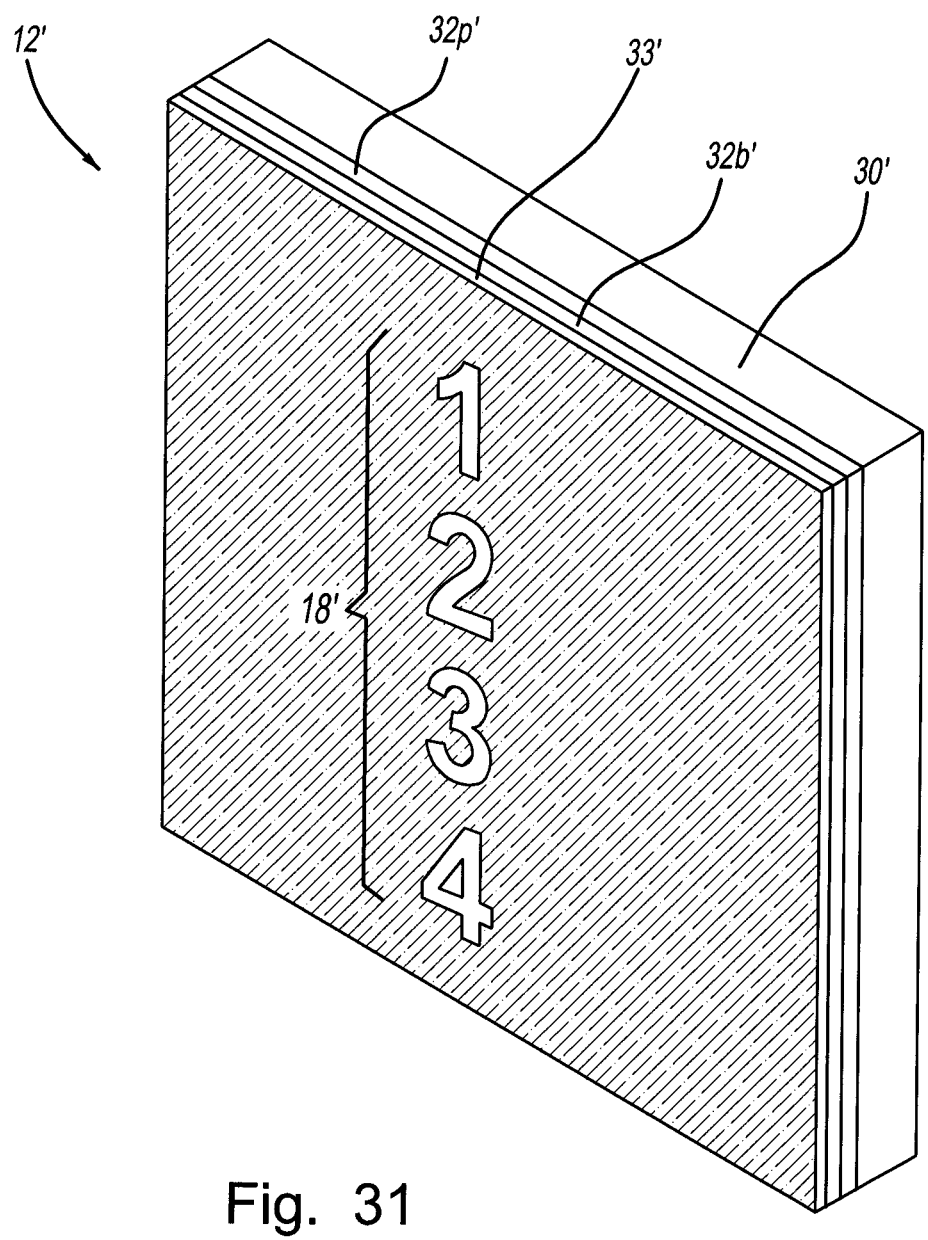

A final exemplary embodiment of the invention is illustrated in FIG. 24 comprising a schematic trim component 480. The embodiment of FIG. 24 shares many of the features of the previously-described embodiments, which will not be described in detail herein unless necessary for a complete understanding of the invention. Specifically, the embodiment of FIG. 24 can be identical to the embodiments of FIGS. 5A, 5B, 22, and 23, except that the trim component structure 480 can include a conventional rigid FR4-type PCB mask 39. The rigid PCB mask 39 can be incorporated into a generally rectilinear trim component structure 480.

The rigid PCB mask 39 can comprise an opaque FR4-type material with portions selectively removed, such as by laser cutting, punching, routing, CNC machining, and the like, to define indicia 18. The rigid PCB mask 39 can be joined to a "B" surface 28 of the substrate 30 as generally described previously herein. The substrate 30, variably light-transmissive layer 32, rigid PCB mask 39, and illumination source 36 can function in generally the same manner as in the previous embodiments with respect to the indicia 18 and its discernibility to an observer under differing conditions of illumination.

While the invention has been specifically described in connection with certain specific embodiments thereof, it is to be understood that this is by way of illustration and not of limitation, and the scope of the appended claims should be construed as broadly as the prior art will permit.

The invention claimed is:

1. A vehicular trim component with interior and exterior surfaces, the vehicular trim component comprising:
    an at least partially light-transmissive substrate having opposite first and second surfaces;
    an illumination source adjacent the second surface of the substrate, the illumination source actuatable between an illuminated state and a non-illuminated state; and
    a variably light-transmissive layer on the first surface of the substrate, the variably light-transmissive layer including a non-light-transmissive opaque portion and a light-transmissive portion, the light-transmissive portion comprising one or more lines defined in the opaque portion and arranged to define visually perceptible indicia when backlit by the illumination source in its illuminated state, and each line being visually imperceptible to the naked eye from a distance of at least as close as approximately 3 feet from the trim component when the illumination source is in its non-illuminated state.

2. The vehicular trim component of claim 1, wherein the variably light-transmissive layer comprises a basecoat of opaque paint applied to the first surface of the substrate.

3. The vehicular trim component of claim 2, wherein the variably light-transmissive layer further comprises a clear coat disposed on top of the basecoat of paint.

4. The vehicular trim component of claim 3, wherein the one or more lines are defined in the base coat of paint and the clear coat.

5. The vehicular trim component of claim 3, wherein the one or more lines are defined in the basecoat of paint, and the clear coat covers the base coat and the one or more lines.

6. The vehicular trim component of claim 1, wherein the variably light-transmissive layer comprises an opaque primer applied to the first surface of the substrate, and a basecoat of opaque paint applied over the primer.

7. The vehicular trim component of claim 6, wherein the variably light-transmissive layer further comprises a clear coat disposed on top of the basecoat of paint.

8. The vehicular trim component of claim 7, wherein the one or more lines are defined in the basecoat of paint and the clear coat.

9. The vehicular trim component of claim 7, wherein the one or more lines are defined in the basecoat of paint, and the clear coat covers the basecoat and the one or more lines.

10. The vehicular trim component of claim 1, wherein the variably light-transmissive layer comprises an opaque film applied to the first surface of the substrate.

11. The vehicular trim component of claim 10, wherein the film is applied using a hydro-graphics process.

12. The vehicular trim component of claim 10, wherein the film is insert molded with the substrate.

13. The vehicular trim component of claim 1, wherein the variably light-transmissive layer comprises at least one metal deposition layer.

14. The vehicular trim component of claim 1, wherein the illumination source comprises at least one light source selected from the group consisting of: a light-emitting diode, an incandescent light bulb, a fluorescent light bulb, an electroluminescent light source, a neon light, a light pipe received from a remote light source, a fiber optic-received light, a liquid-crystal display and a laser.

15. The vehicular trim component of claim 14, wherein the light source is a display screen, and the display screen is hidden by the variably light-transmissive layer when the display screen is in the non-illuminated state.

16. The vehicular trim component of claim 1, wherein the indicia is at least one of a trademark, one or more alphanumeric characters, a logo, a design, a symbol, a picture, an image, an indicator, and a frit.

17. The vehicular trim component of claim 1, wherein the substrate comprises a material selected from the group consisting of: a polymeric material, glass, a conductive material, and silicone.

18. The vehicular trim component of claim 1, wherein the substrate comprises a translucent portion.

19. The vehicular trim component of claim 18, wherein the substrate includes at least one optic area for distributing light passing through the translucent portion.

20. The vehicular trim component of claim 1, wherein the trim component comprises a keyless entry pad.

21. The vehicular trim component of claim 1, wherein the trim component comprises a door handle.

22. The vehicular trim component of claim 1, wherein the trim component comprises a lift handle for a rear lift gate.

23. A method of manufacturing a vehicular trim component with interior and exterior surfaces, comprising the steps of:
providing an at least partially light-transmissive substrate having opposite first and second surfaces;
applying an opaque coating on the first surface of the substrate;
removing part of the opaque coating to define one or more lines arranged to define visually perceptible indicia when backlit by an illuminated illumination source, each of the one or more lines being visually imperceptible to the naked eye from a distance of at least as close as approximately 3 feet from the trim component when the illumination source is not illuminated; and
positioning an illumination source adjacent the second surface of the substrate, the illumination source actuatable between an illuminated state and a non-illuminated state, and
wherein, when viewed from the exterior of the vehicular trim component, (i) the indicia is visually imperceptible to the naked eye from a distance of at least as close as approximately 3 feet from the trim component when the illumination source is in the non-illuminated state, and (ii) the indicia is visually perceptible when the illumination source is in the illumination state.

24. The method of claim 23, wherein the opaque coating comprises a basecoat of opaque paint applied to the first surface of the substrate.

25. The method of claim 24, further comprising the step of applying a clear coat on top of the basecoat of paint.

26. The method of claim 25, wherein the one or more lines are defined by removing part of the basecoat of paint and part of the clear coat.

27. The method of claim 26, wherein the one or more lines are defined by removing part of the basecoat of paint and part of the clear coat by laser etching.

28. The method of claim 25, wherein the one or more lines are defined by removing part of the basecoat of paint, and the clear coat covers the base coat and the one or more lines.

29. The method of claim 28, wherein the one or more lines are defined by removing part of the basecoat of paint by laser etching.

30. The method of claim 23, wherein the opaque coating comprises an opaque primer applied to the first surface of the substrate, and a basecoat of opaque paint applied over the primer.

31. The method of claim 30, further comprising the step of applying a clear coat on top of the basecoat of paint.

32. The method of claim 31, wherein the one or more lines are defined by removing part of the primer, part of the basecoat of paint and part of the clear coat.

33. The method of claim 32, wherein the one or more lines are defined by removing part of the primer, part of the basecoat of paint and part of the clear coat by laser etching.

34. The method of claim 31, wherein the one or more lines are defined by removing part of the primer, part of the basecoat of paint, and the clear coat covers the base coat and the one or more lines.

35. The method of claim 34, wherein the one or more lines are defined by removing part of the primer and part of the basecoat of paint by laser etching.

36. The method of claim 23, wherein the opaque coating comprises an opaque film applied to the first surface of the substrate.

37. The method of claim 36, wherein the opaque film is applied using a hydro-graphics process.

38. The method of claim 36, wherein the opaque film is insert molded with the substrate.

39. The method of claim 23, wherein the opaque coating comprises at least one metal deposition layer.

40. The method of claim 23, wherein the illumination source comprises at least one light source selected from the group consisting of: a light-emitting diode, an incandescent light bulb, a fluorescent light bulb, an electroluminescent light source, a neon light, a light pipe received from a remote light source, a fiber optic-received light, a liquid-crystal display and a laser.

41. The method of claim 40, wherein the light source is a display screen, and the display screen is hidden by the variably light-transmissive layer when the display screen is in the non-illuminated state.

42. The method of claim 23, wherein the indicia is at least one of a trademark, one or more alphanumeric characters, a logo, a design, a symbol, a picture, an image, an indicator, and a frit.

43. The method of claim 23, wherein the substrate comprises a material selected from the group consisting of: a polymeric material, glass, a conductive material, and silicone.

44. The method of claim 23, wherein the substrate comprises a translucent portion.

45. The method of claim 44, wherein the substrate includes at least one optic area for distributing light passing through the translucent portion.

46. The method of claim 23, wherein the trim component comprises a keyless entry pad.

47. The method of claim 23, wherein the trim component comprises a door handle.

48. The method of claim 23, wherein the trim component comprises a lift handle for a rear lift gate.

* * * * *